(12) United States Patent
McLeod et al.

(10) Patent No.: US 6,711,884 B1
(45) Date of Patent: Mar. 30, 2004

(54) MOBILE HARVESTING UNIT

(75) Inventors: Robert H. McLeod, Winnipeg (CA); David Rodney Schadlich, Rockyford (CA); Kenneth Ross Parson, Elrose (CA)

(73) Assignee: McLeod Harvest Inc., Winnipeg (CA)

( * ) Notice: Subject to any disclaimer, the term of this patent is extended or adjusted under 35 U.S.C. 154(b) by 0 days.

(21) Appl. No.: 09/590,186

(22) Filed: Jun. 9, 2000

(30) Foreign Application Priority Data

Jun. 9, 1999 (CA) ............................................. 2274288

(51) Int. Cl.[7] ........................ A01D 34/03; A01D 34/43; A01D 34/64
(52) U.S. Cl. ............................................................ 56/14.9
(58) Field of Search ............................. 56/14.6, 14.9, 56/15.5; 172/248, 311; 280/412, 413, 473, 411.1

(56) References Cited

U.S. PATENT DOCUMENTS

| | | | | |
|---|---|---|---|---|
| 2,212,465 A | * | 8/1940 | Baldwin | 56/10.6 |
| 2,266,805 A | * | 12/1941 | Ronning | 460/13 |
| 2,609,929 A | | 9/1952 | King | 209/135 |
| 2,844,931 A | * | 7/1958 | Irvine | 56/15.5 |
| 3,121,986 A | * | 2/1964 | Scranton | 56/218 |
| 3,183,981 A | * | 5/1965 | Schlabs | 172/162 |
| 3,224,560 A | | 12/1965 | Jarvis | 198/64 |
| 3,315,449 A | * | 4/1967 | Morrison et al. | 56/14.6 |
| 3,460,698 A | | 8/1969 | Harris | 214/519 |
| 3,537,243 A | * | 11/1970 | Bichel | 56/14.6 |
| 3,580,257 A | | 5/1971 | Teague | 130/24 |
| 3,665,685 A | | 5/1972 | Allard | 56/10.4 |
| 4,018,036 A | | 4/1977 | Cicci | 56/1 |
| 4,018,294 A | | 4/1977 | Rankins et al. | 180/13 |
| 4,060,167 A | | 11/1977 | Smith | 198/622 |
| 4,178,010 A | * | 12/1979 | Gerber | 280/412 |
| 4,411,038 A | | 10/1983 | Mukai | 15/3.13 |
| 4,445,706 A | * | 5/1984 | Jarosek | 280/411 |
| 4,467,818 A | | 8/1984 | Donaldson et al. | 130/27 |
| 4,515,686 A | | 5/1985 | Janich | 209/139 |
| 4,522,020 A | * | 6/1985 | Anderson | 56/209 |
| 4,669,674 A | | 6/1987 | Oldengott et al. | 241/101.7 |
| 4,838,358 A | | 6/1989 | Freudendahl | 172/125 |
| 4,936,978 A | | 6/1990 | Bortnikov et al. | 209/10 |
| 4,979,359 A | * | 12/1990 | Inskeep | 56/14.9 |
| 5,025,616 A | | 6/1991 | Moss | 56/14.9 |
| 5,146,737 A | | 9/1992 | Gantzer | 56/14.9 |
| 5,203,154 A | * | 4/1993 | Lesher et al. | 56/366 |
| 5,339,907 A | | 8/1994 | Roth | 172/678 |

(List continued on next page.)

FOREIGN PATENT DOCUMENTS

| | | |
|---|---|---|
| AU | A-71759/96 | 11/1996 |
| CA | 638 703 | 3/1962 |
| CA | 1053528 | 5/1979 |
| CA | 1047876 | 6/1979 |
| CA | 1094904 | 3/1981 |

(List continued on next page.)

OTHER PUBLICATIONS

Product Specification of New Holland Company, Jan. 3, 2000, one page.

(List continued on next page.)

*Primary Examiner*—Árpád Fábián Kovács

(57) ABSTRACT

A hitching arm for a graff harvester comprising a rigid elongated element having two opposite ends for connection, respectively, to the graff harvester and to a propulsion device, wherein the arm has upwardly extending sections extending from each opposite end towards a centre of the hitching arm, and an elevated centre section. The shape of the arm allows the arm to pull a harvesting unit having a cutter head at the front extend over the cutter head.

6 Claims, 20 Drawing Sheets

U.S. PATENT DOCUMENTS

| | | | |
|---|---|---|---|
| 5,462,131 A | 10/1995 | Eidam et al. | 180/14.4 |
| 5,503,712 A | 4/1996 | Brown | 162/55 |
| 5,531,283 A | 7/1996 | Austin et al. | 180/53.1 |
| 5,544,475 A * | 8/1996 | Skibo | 56/15.5 |
| 5,706,901 A | 1/1998 | Walters et al. | 172/439 |
| 5,794,423 A | 8/1998 | McLeod | 56/14.6 |
| 5,795,222 A | 8/1998 | McLeod | 460/97 |
| 5,873,226 A | 2/1999 | McLeod | 56/14.6 |
| 6,082,085 A * | 7/2000 | Stelzer et al. | 56/14.9 |
| 6,119,789 A | 9/2000 | Taylor | 172/439 |
| 6,178,728 B1 * | 1/2001 | Rowse et al. | 56/15.5 |

FOREIGN PATENT DOCUMENTS

| | | |
|---|---|---|
| CA | 1112975 | 11/1981 |
| CA | 2247070 | 3/2000 |
| DE | 1 952 567 | 6/1971 |
| DE | 23 49 176 A1 | 4/1975 |
| DE | 2 650 617 | 5/1978 |
| DE | 35 404 93 | 11/1985 |
| DE | 3528638 A1 | 2/1987 |
| EP | 0 406 961 | 2/1990 |
| EP | 0 678 236 | 10/1995 |
| FR | 1010545 | 9/1948 |
| FR | 1 447 739 | 9/1965 |
| FR | 70.28195 | 7/1970 |
| GB | 888814 | 2/1962 |
| GB | 1255045 | 11/1971 |
| GB | 1 583 983 | 5/1977 |
| GB | 2 021 527 | 9/1979 |
| GB | 1568565 | 6/1980 |
| GB | 1586565 | 3/1981 |
| GB | 2 338 880 A | 7/1998 |
| SU | 1036293 A | 8/1983 |
| SU | 1261579 A1 | 10/1986 |
| SU | 1496684 A1 | 7/1989 |
| WO | WO 00/76294 | 12/2000 |

OTHER PUBLICATIONS

Translation of claims of French Patent 1 447 739, Date Jun. 1966.

Translation of claims of French Patent 2,104,695, Date Apr. 1972.

Translation of claims of German Patent 2 650 617, Date May 1978.

Translation of claims of German Patent 35 404 93, Date Apr. 1987.

* cited by examiner

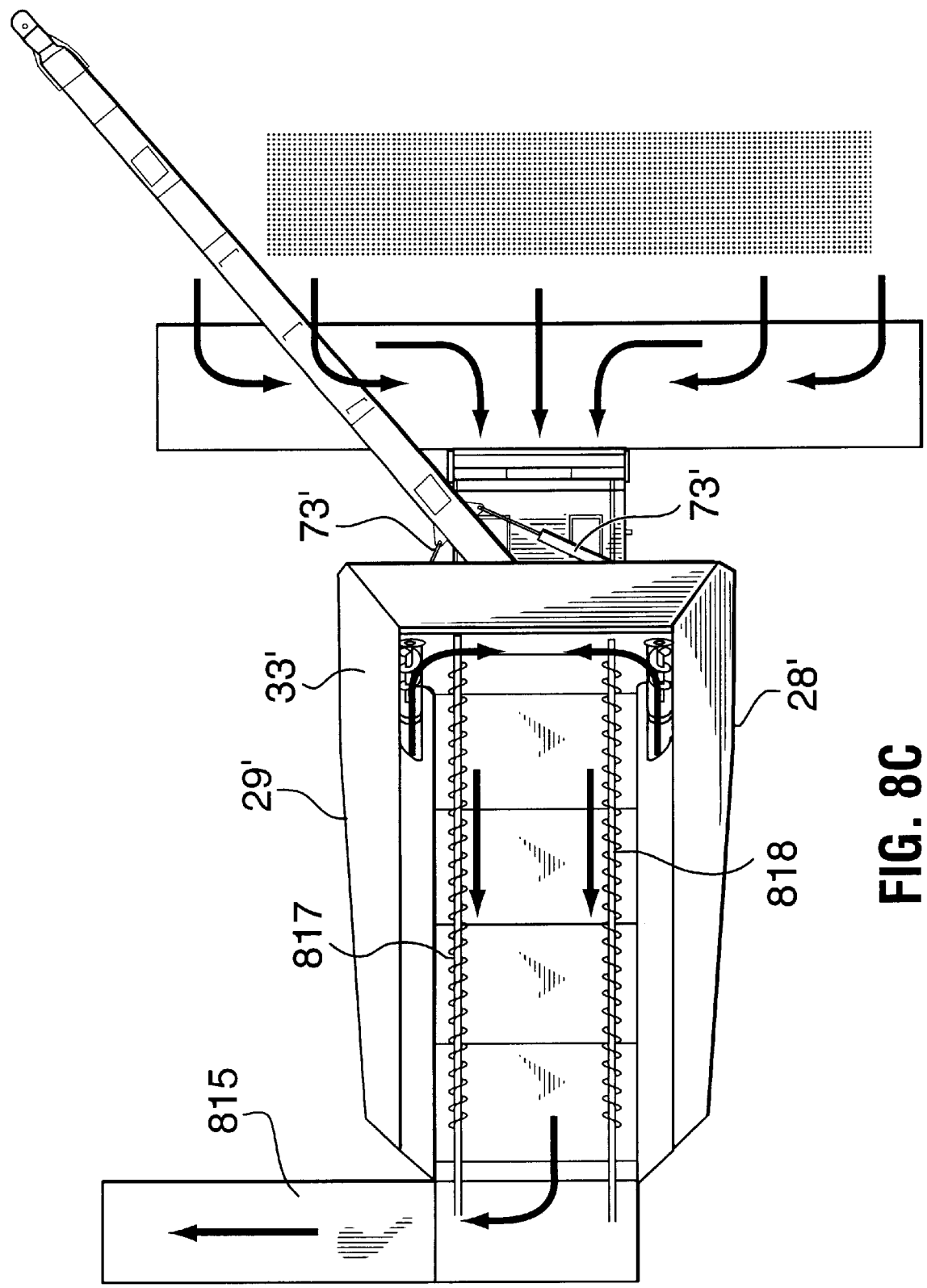

MOBILE HARVESTING UNIT

BACKGROUND OF THE INVENTION

1. Field of the Invention

This invention relates to the harvesting of grain and seed crops of the kind that are conventionally harvested by means of a combine harvester. More particularly, the invention relates to systems, methods and apparatus for harvesting such crops.

2. Description of the Prior Art

The applicant herein has already disclosed a novel method of and apparatus for harvesting grain and seed crops that provide an alternative to the use of conventional combine harvesters. In this regard, reference is made to U.S. Pat. No. 5,794,423 issued on Aug. 18, 1998; U.S. Pat. No. 5,795,222 issued on Aug. 18, 1998; and U.S. Pat. No. 5,873,226 issued on Feb. 23, 1999; all of these patents having been assigned to McLeod Harvest Inc. and are referred to collectively in the following description as "the McLeod patents."

A conventional combine harvester operates by carrying out all of the harvesting steps in the field on a continuous basis. The crop plants are cut, the cut plants are threshed to separate grain (or seeds such as peas, etc.), chaff and (inevitably) weed seeds from the stalks, the grain is then cleaned by separating it from the chaff and weed seeds, the grain is delivered to a waiting collection vehicle, and the stalks, chaff and weed seeds are returned to the field. The disadvantages of this are that (a) combine harvesters are very expensive to purchase and to operate; (b) they are not very efficient at cleaning the grain, so some grain is lost and/or further grain cleaning is required; and (c) chaff and weed seeds are returned to the field, so that their economic value is lost and weeds proliferate.

The concept underlying the systems disclosed in the above patents is that, instead of attempting to carry out all of the harvesting steps in the field, only the step of threshing and removing stalks is carried out, and the remaining product (a mixture of grain, chaff and weed seeds—referred to by the coined word "graff") is collected and transported to a fixed grain cleaning site. The advantage of this is that the harvesting equipment may be less complicated and expensive than a conventional combine harvester, the cleaning of the grain may be carried out more efficiently at a fixed site, the economic value of the chaff and weed seeds may be realized, and the need for herbicides is reduced (because the weed seeds are collected rather than being returned to the field).

It has been found that this system is extremely effective, but inconveniences have been encountered in that graff has proven to be a difficult material to handle and process. Since graff contains a large percentage of chaff, it is bulky for its weight and it is quite fibrous in composition. Unlike grain collected by a combine harvester, graff does not easily "flow" from containers and it is difficult to move by conventional means, such as augers, because it bridges or binds within itself and does not flow internally to replace material that has been removed from the bottom of a container or pile of the material. In general, it can be said that graff tends to pack, clump, bridge, rat-hole and bind, rather than flow smoothly. This causes problems not only when the graff is stored in silos or the like before it is processed, but also causes difficulties of material flow within the harvesting device and transportation vehicles.

Moreover, graff is difficult to store because, if stored in the open, it tends to blow away and also to spoil if it gets wet. However, if stored in a container, it is difficult to remove for the reasons mentioned above.

Additionally, there is a need to improve the overall efficiency of the system generally and to improve the manner in which individual components operate in order to increase the economic competitiveness of the system with conventional harvesting systems.

SUMMARY OF THE INVENTION

An object of the invention is to improve the efficiency and to reduce the equipment cost of carrying out a grain harvesting method of the type disclosed in the patents mentioned above.

Another object of the invention, at least in its preferred forms, is to overcome difficulties caused by the poor flow properties of graff.

Another object of the invention, at least in broader aspects, is to optimize a grain harvesting system as opposed to a single grain harvesting machine such as a conventional combine harvester.

Another object of the invention is to reduce the operational cost of carrying out a grain harvesting method of the type disclosed in the patents mentioned above.

Another object of the invention, at least in its preferred forms, is to improve the effectiveness of the harvesting unit used to separate the graff from the crop stalks in the field.

Another object of the invention, at least in its preferred forms, is to improve the effectiveness of the grain cleaning mill used to separate grain from the remainder of the graff at a fixed site and to process crop the residue.

According to one aspect of the invention, there is provided a method of harvesting and cleaning a plant crop, wherein the crop is cut from a field area and threshed in a mobile harvesting unit to produce stalks that are returned to the field area and "graff", a mixture including grain, chaff and weed seeds, which is collected within the harvesting unit; the collected graff is transferred periodically from the harvesting unit to at least one vehicle and transported by said at least one vehicle to a cleaning mill, and the graff is cleaned by the cleaning mill to produce a cleaned grain product and "millings", a mixture including chaff and weed seeds. To avoid problems caused by the poor flow characteristics and very low density of graff, the method is operated to avoid storage of the graff prior to cleaning by the cleaning mill.

What we mean by avoiding storage of the graff prior to cleaning is that the graff is not transferred to any temporary storage container or storage pile from the time it is produced by the harvester to the time it is cleaned by the cleaning mill. The graff is held only in the harvester unit and the vehicle, and is fed immediately into the cleaning mill. Consequently, the use of stationary surge bins and the like at the cleaning mill or other area is specifically avoided. The graff is fed directly from the harvesting unit to the vehicle, and directly from the vehicle to the a receiving unit for the cleaning mill from which it is fed substantially immediately and completely into the cleaning mill.

Thus, according to another aspect of the present invention, there is provided a system for harvesting and cleaning a plant crop, which includes a harvesting unit for cutting a crop from a field area and for threshing the cut crop to produce stalks that are returned to the field area and "graff", a mixture including grain, chaff and weed seeds, which is collected within the harvesting unit; at least one vehicle for receiving collected graff from the harvester unit when the harvesting unit is at least partially full, and for transporting the graff to a cleaning mill; and a cleaning mill located at a site (yard area) remote from the field area, for cleaning the graff to produce a cleaned grain product and "millings", a mixture containing chaff and weed seeds. The system specifically excludes and avoids the use of any device for storage of the graff prior to cleaning of the graff in the cleaning mill.

According to another aspect of the invention, there is provided a stationary cleaning mill for graff, comprising an entrance (usually located at an elevated position) for the graff, screening apparatus for separating grain from the graff to produce cleaned grain and millings, and separate outlets for the cleaned grain and millings. The cleaning mill includes a receiving unit for the graff for feeding the graff to the entrance of the graff cleaning mill, the receiving unit being sized to permit a graff delivery vehicle to drive into the receiving unit to transfer an entire vehicle load of graff to the receiving unit by a direct dumping operation of the entire vehicle load.

In another aspect, the invention provides a stationary cleaning mill for graff, comprising an entrance (usually located an elevated position) for the graff, screening apparatus for separating grain from the graff to produce cleaned grain and millings, and separate outlets for the cleaned grain and millings. The cleaning mill includes a material-conveying fan at the outlet for the millings, the material-conveying fan impacting the millings to cause at least partial crushing or breaking of weed seeds in the millings, removing the millings from the cleaning mill, and propelling the millings through the outlet for the millings.

According to yet another aspect of the invention, there is provided a mobile harvesting unit for harvesting graff, including a wheeled harvester body and a harvesting header at the front of the harvester body for cutting a crop from a field area, the harvester body containing a threshing unit for the cut crop for separating stalks from graff, a discharge for discharging separated stalks back to the field area, and a storage tank for storage of the separated graff. The harvesting unit includes an elongated hitching arm having opposite lateral ends for connection at one end to the harvester body and at an opposite end to a rear portion of a propulsion device, the hitching arm having a raised section intermediate the opposite ends passing over and clear of the harvesting header.

According to yet another aspect of the invention, there is provided a hitching arm for a graff harvester, comprising a rigid elongated element having two opposite ends for connection, respectively, to the graff harvester and to a propulsion device. The arm has upwardly extending sections extending from each opposite end towards a centre of the hitching arm, and an elevated centre section.

According to still another aspect of the invention, there is provided a receiving unit for graff, for feeding graff to an elevated entrance of a graff cleaning mill, including a receptacle for graff and a conveyor for raising graff from the receptacle to the elevated entrance. The receptacle is sized to permit a graff delivery vehicle to drive into the receptacle and to deposit an entire vehicle load of graff into the receptacle by a direct dumping operation.

Preferably, the invention may provide a method of harvesting and cleaning a plant crop, wherein the crop is cut from a field area and threshed in a mobile harvesting unit to produce stalks that are returned to the field area and graff, a mixture of threshed grain kernels, chaff and weed seeds, which is collected within the harvesting unit, the collected graff is transferred to a vehicle when the harvesting unit is full, the graff is transported by the vehicle to a cleaning mill located in a yard area remote from the field area, and the graff is cleaned automatically by the cleaning mill to produce a cleaned grain product and a mixture of chaff and weed seeds, wherein a capacity of the harvesting unit to hold graff is made the same as or smaller than a capacity of a vehicle used for the delivery, the rate of cleaning of the graff by the cleaning mill is made the same as or higher than a rate of graff output from the field area averaged over several cycles of filling and emptying the harvesting unit and transfer to the vehicle, and the number and speed of operation of the vehicles is made high enough to avoid substantial waiting periods between filling of the harvesting unit with graff and transfer of the collected graff to the vehicle.

Preferably, the capacity of the harvesting unit is substantially the same as the capacity of the vehicle, and a single vehicle is provided for transporting the graff.

It is also preferable that the capacity of the cleaning mill to hold and process graff is no less than the capacity of the vehicle to transport graff from the field area to the cleaning mill, and the rate of cleaning of the graff by the cleaning mill is about the same as the rate of graff output from the field area.

In another preferred form, the invention provides a system of harvesting and cleaning a plant crop, which comprises: a harvesting unit for cutting a crop from a field area and threshing the cut crop to produce stalks that are returned to the field area and "graff", a mixture of grain, chaff and weed seeds, which is collected within the harvesting unit, a vehicle for receiving collected graff from the harvester unit when the harvesting unit is full, and for transporting the graff to a cleaning mill; and a cleaning mill located in a yard-area remote from the field area, for cleaning the graff to produce a cleaned grain product and "millings", a mixture of chaff and weed seeds, wherein a capacity of the harvesting unit to hold graff is made the same as or smaller than a capacity of a vehicle used for the delivery, a rate of cleaning of the graff by the cleaning mill is made the same as or higher than a rate of graff output from the field area averaged over several cycles of filling and emptying the harvesting unit and transfer to the vehicle, and a number and speed of operation of the vehicles is made high enough to avoid substantial waiting periods between filling of the harvesting unit with graff and transfer of the collected graff to the vehicle.

In another preferred aspect, the invention relates to a mobile harvesting unit for harvesting graff, comprising a harvesting header (e.g. a direct-cut or swath pick-up type) at a front of the harvesting unit for removing a crop from a field area, a threshing unit for separating stalks from a mixture graff, a mixture of grain, chaff and weed seeds, a storage tank for storage of the separated graff, and a hitching arm for connection to a rear portion of a propulsion device, the hitching arm being of inverted generally U-shape to allow attachment at opposite ends of the arm to the unit and the propulsion device while extending over the harvesting header.

In the harvesting unit of this kind, the hitching arm preferably supports and guides a mechanical driveling for transferring mechanical power from the propulsion device to the harvesting unit, the driveline including a plurality of rotary shafts joined by constant velocity joints or U-joints to allow the driveline to adapt to changes of direction of the hitching arm. The hitching arm may also be used for guiding and protecting hydraulic tubes for conveying hydraulic fluid under pressure from the propulsion device to the harvesting unit. These tubes may pass through an interior channel in the hitching arm.

In another preferred aspect, the invention relates to a mobile harvesting unit for harvesting graff, comprising a cutting head, a threshing unit for separating stalks from graff, a mixture of grain, chaff and weed seeds, a storage tank positioned above the threshing unit for temporarily storing graff, an auger bed for transporting graff to collection areas on opposite lateral sides of the unit, and a pair of graff elevators, one on each side of the storage tank, for simultaneously removing graff from the collection areas of the auger bed and for delivering removed graff to a top of the storage tank.

Further, the invention in another preferred aspect relates to a cleaning mill for graff, comprising a receiving unit for graff sized to allow a graff transportation vehicle to drive at least partially therein for dumping a load of graff, a graff conveyor for feeding graff into the mill as a moving matted layer of approximately constant thickness (preferably in the range of 1.5 to 3 inches), and elevators for tilting the receiving unit, following removal of the vehicle, to cause the load of graff to slide to the graff conveyor.

Further, in another preferred aspect, the invention relate to a cleaning mill for graff, comprising an aspirator for blowing air through a falling matted layer of graff to remove chaff and light materials leaving aspirated graff containing grain kernels and heavy materials, a centrifugal separator for removing the chaff from the air after passing through the curtain of graff, a fan and ductwork for recirculating air continually through the curtain of graff and through the separator, a screening unit for separating grain from remaining materials from the aspirated graff, an outlet for the separated grain, a mill for milling the remaining materials to produce millings, ductwork for circulating the millings to the centrifugal separator, an outlet device for removing solids from the centrifugal separator for discharge from the mill.

It will be appreciated that, in the following discussion, the reference to "grain kernels" or "grain" as the desired product of the harvesting operation should be taken to include the grain kernels or seeds of all crops that are harvestable by conventional combine harvesters, not merely wheat. Such products include, for example, oats, barley, peas, lentils, rice, soybeans, mustard seed, canola, rapeseed, etc. The harvesting system of the present invention can be operated with all such crops.

Moreover, while the grain kernels are separated from the graff to leave a mixture of chaff, weed seeds and other materials, referred to as millings, the components of the millings may themselves, if desired, be separated either during the cleaning of the grain in the cleaning mill, or subsequently. Separate outlets may be provided for the separate components of the millings. Thus, while the claims of this application may refer to an outlet for millings, there may in practice be two or more outlets for various components of the millings, and the term used in the claims is intended to cover this eventuality.

It will also be understood that the millings may contain additional elements such as unthreshed heads, pieces of straw, dust, leaves, and other harvesting residues and debris, and so the term should not be limited merely to a mixture of weed seeds and chaff.

In the following description, numerical values are often expressed both in metric units and in non-metric units (the latter being shown in brackets). In the event of any discrepancy, the values expressed in non-metric units should be considered correct.

BRIEF DESCRIPTION OF THE DRAWINGS

FIG. 8C is a top plan view of the harvesting unit of FIG. 8 looking down upon the graff collection tank and showing (by arrows) the direction of movement of graff through the tank and removal chute;

DETAILED DESCRIPTION OF THE PREFERRED EMBODIMENTS

Harvesting Method

Figure 1:
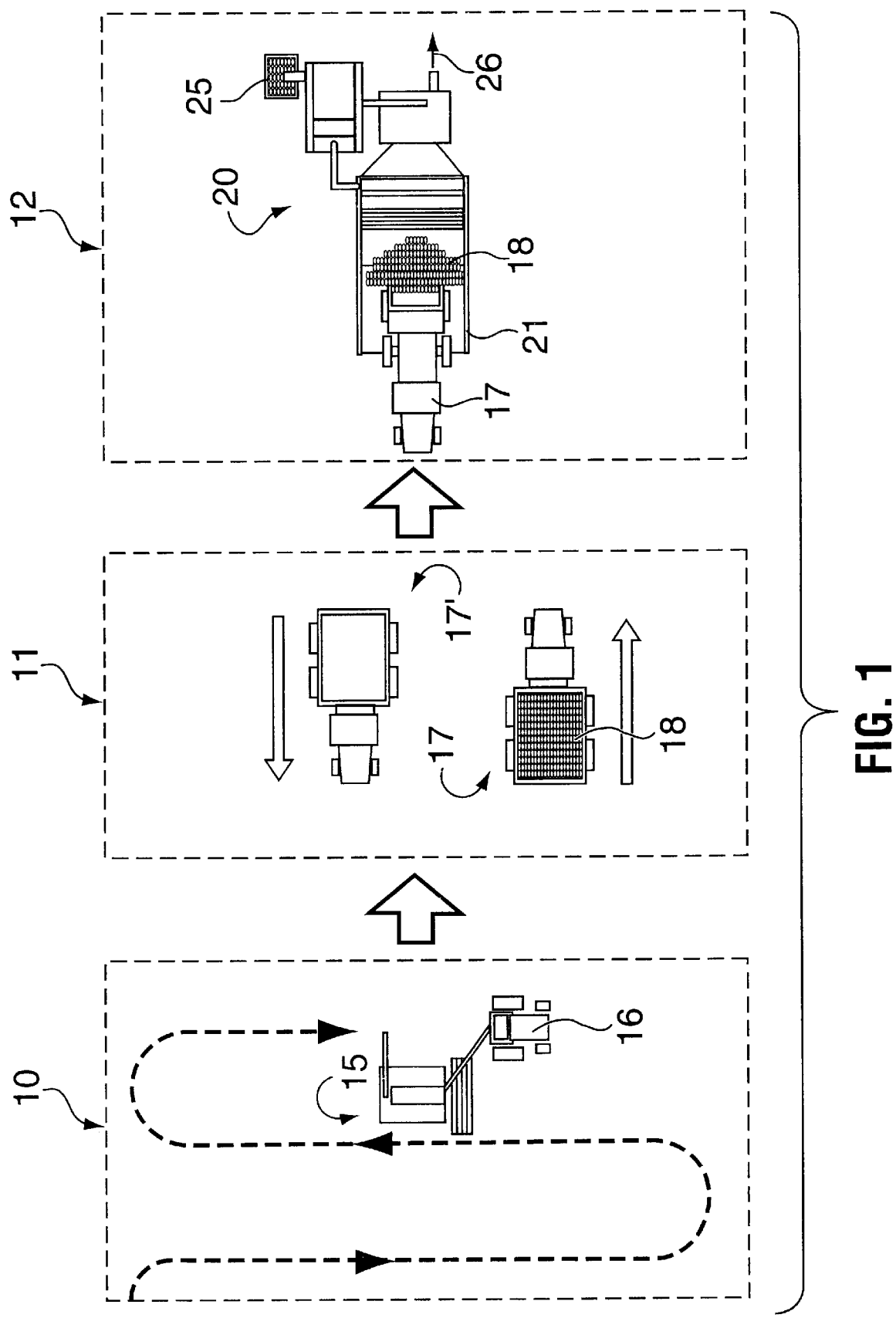
FIG. 1 is a schematic sketch illustrating the overall harvesting method according to a preferred form of the present invention.

One of the objectives underlying the present invention is to improve the efficiency of the graff harvesting and cleaning system described in the McLeod patents mentioned above, as well as providing a further alternative to the use of conventional combine harvesters for harvesting grain. The inventors named in the present application has found that one way of achieving this is to ensure that components of the system are designed so that harvested material (the graff) flows constantly and efficiently through the system without avoidable delays. This has the advantage not only of maximizing operation efficiency, but also of avoiding the need for temporary storage of graff and thus avoiding the problems caused by the poor flow properties of graff.

As in the McLeod patents, the components of the system of the present invention comprise: (1) a mobile harvesting unit for harvesting the crop, i.e. for collecting graff and returning stalks to the field; (2) a cleaning mill for separating grain kernels from the remainder of the graff, and preferably for crushing and/or shredding the remainder of the graff to compact it and to reduce the viability of the weed seeds; and (3) one or more vehicles (normally trucks provided with open truck boxes coverable by a tarpaulin or the like to prevent loss of graff through blowing) for transporting harvested graff from the harvesting unit to the cleaning mill.

As already noted, a particular problem encountered in dealing with graff is that, while it is not particularly heavy, it is very bulky compared to the cleaned grain product delivered from a conventional combine harvester (the amount of graff collected from a given crop area may be as much as four times higher in terms of volume than the amount of grain collected by a combine harvester from the same crop area). Moreover, unlike grain, graff does not flow easily; it tends to pack, clump, bridge, rat-hole and bind, making its transfer within and between mechanical equipment very difficult.

In view of the problem of excessive bulk, one might think that a solution would be to provide a harvesting unit with an internal graff collection container (storage tank) that is as large as possible to avoid the need for frequent stops to discharge the collected graff. However, if this is done, the volume of the collected graff may exceed the capacity of the transport vehicle (truck) used to transport the graff to the cleaning mill, resulting in delays and/or the need for additional vehicles. Similarly, if the amount of graff delivered to the cleaning mill at one time is too large, there may be a build-up or overflow of collected unprocessed graff, ultimately resulting in a temporary storage or termination of harvesting to allow for the graff build-up to be processed.

A preferred solution to this problem is to ensure that the capacities of the various components (harvesting unit, vehicle, cleaning mill) are matched to allow an even and continuous flow of graff through the system to avoid the need for temporary storage of the graff before it is processed. Consequently, the graff-holding capacity of the harvesting unit should preferably be as large as possible, but no larger than the capacity of a vehicle used to transport the graff to the cleaning mill, and the throughput of the cleaning mill should preferably be such that it may handle a volume of graff at least as great as the graff holding capacity of a vehicle used to transport the graff in the vehicle turnaround time (the time between successive deliveries of graff from the harvesting unit to the cleaning mill).

This is illustrated schematically in FIG. 1 of the accompanying drawings. The drawing is a plan view representing in a very general way a field area 10, a road (or track) system 11 and a yard area 12. A harvesting unit 15 (graff harvester), pulled by a conventional tractor 16, harvests a crop from the field area 10, returns stalks to the land and collects graff (threshed grain kernels, chaff, weed seeds, small bits of straw, etc.) inside the harvesting unit 15 in an internal container (storage tank) until the container is full. The harvesting unit 15 then stops and unloads the collected graff into a graff transport vehicle 17 (generally a standard dump truck with an open-topped truck box and an openable rear silage gate) which, when full, transports the collected graff 18 to a cleaning mill 20 located in the yard area 12. Here, the vehicle 17 dumps the graff 18 through the entire rear gate into a graff receiving unit 21 of the cleaning mill 20 and returns (as shown at 17') to the field area to repeat the cycle. The capacity of the graff receiving unit 21 should be at least as large as the carrying capacity of the vehicle 17 so that the vehicle may unload fully immediately upon arrival at the cleaning mill so that it is not delayed. If the cleaning mill 20 is intended to process the graff from several harvester units at the same time, then the capacity of the cleaning mill must be increased correspondingly. The graff 18 deposited in the receiving unit 21 of the cleaning mill passes immediately through the cleaning mill and is separated into cleaned grain 25 and millings 26 (a mixture of smaller grain kernels, weed seeds, chaff, and small bits of straw, etc.) that have been subjected to milling.

The harvesting unit 15 has an internal graff storage capacity that should be approximately the same as, or at least no larger than, the capacity of the vehicle 17 so that the internal container of the harvesting unit, when full, may be emptied completely into the truck box of a single vehicle 17. This may be done by stopping the harvesting unit at a waiting truck, or by emptying the harvesting unit into a moving truck as both continue to move (with or without further harvesting). More than one vehicle may be provided, depending on the distance of the field area 10 from the yard area 12, and the rate of operation of the harvesting unit 15. Ideally, there should be a waiting vehicle 17 whenever the harvesting unit 15 is filled and is consequently required to stop. For greatest economy of operation, only a single vehicle 17 is required to operate the method continuously, which means that the time required to fill the container of the harvesting unit with harvested graff should be approximately the same as the time for transport, dumping and return of the single vehicle 17.

This may be expressed in another way. Although the harvesting unit 15 harvests (collects and delivers) the graff on a batch basis, it will, on average, have a rate of graff delivery that can be expressed in units of weight or volume per unit time. The rate of graff harvesting by the harvesting unit 15 should, for the most effective and efficient operation, be essentially the same as the average rate of transport of the graff by the vehicle 17 from the field area 10 to the yard area 12.

At the yard area 12, the cleaning mill 20 is capable of processing graff at a certain speed when operating continuously. This can also be expressed in terms of units of weight or volume per unit time. For efficient and effective operation, the speed of processing of the graff should be no slower than the average rate of graff delivery by the vehicle 17, and no slower than the rate of graff harvesting by the harvesting unit 15. This ensures that the various pieces of equipment (harvesting unit, cleaning mill and delivery trucks) all work as an integrated system.

Ideally, therefore, in this system, the rate limiting step should be the harvesting of the crop by the harvesting unit 15. That is to say, the crop should be collected, transported and processed as quickly as the crop can be cut and threshed (stalks removed) by the harvesting unit 15. This means that, if the field area 10 is physically close to the yard area 12, it may be adequate to have a single vehicle 17 because it may have the time to transport, dump and return between each completion of a filling cycle of the harvesting unit. This is the ideal situation. Obviously, from time to time, the ideal arrangement will break down, but the system should be designed to allow such efficient operation to be the norm. As the distance from the field area to the yard area increases, more vehicles may be provided. However, as the separation of the field area from the yard area increases, there will come a time when it is too expensive or impossible to provide enough vehicles 17 to maintain the required minimum rate of collection and delivery of the graff. Often this physical separation limit is found to be in the order of 6 km. On the other hand, the physical separation of the field area 10 and the yard area 12 should have no significant effect on the speed of throughput of the cleaning mill because this should always be the same as, or higher than, the rate of crop cutting and graff collection by the harvesting unit, or several harvesting units if the mill is intended to service several such units. The relative capacities and throughputs of the harvesting unit 15, the vehicle(s) 17 and the mill 20 should be designed and utilized to ensure that this is so. Trucks of the type normally employed for hauling grain and the like usually have a capacity of about 21 m$^3$ (750 cubic feet), so the storage capacity of the harvesting unit 15 and the capacity of the graff receiving unit 21 should preferably be about the same.

While this optional organization of the entire system is desirable, it would still provide problems if carried out with equipment basically as shown in the McLeod patents. The reason for this is best described with reference to FIG. 7 of U.S. Pat. No. 5,795,222, which is one of the McLeod patents. This drawing shows a grain truck 20 having raised sides 21 discharging graff into a hopper 23 through a small discharge port provided at the lower central part of the read raised side of the truck. The hopper is then emptied by a large grain auger 22 into one of several surge storage bins 24 provided for temporary storage. A further auger 26 then transfers graff at a constant rate from one of the bins 24 to the upper entrance 54 of the yard plant (cleaning mill) 48. However, because of the poor flow properties of the graff, it is difficult to discharge the material from the truck through the small discharge port in the rear tailgate of the truck, and difficult to get the graff to flow from the lower conical ends of the surge storage bins. This creates inefficiencies and difficulties that can cause delays in the cleaning of the graff while attempts are made to cause the graff to flow properly again.

Solutions to this problem, at least in its most preferred forms of the present invention, make use of ways of causing graff to flow that have been devised by the inventors. The inventors have observed that graff can be caused to flow without difficulty in the following ways:

1) Graff can be caused to slide bodily or tumble down a slope (or chute) inclined at a suitable downward angle, provided that it is not impeded in any way, e.g. by inwardly tapering or inwardly stepped walls provided at the lateral sides of the sloped surface or chute. This avoids the problem encountered when a delivery truck of the type shown in the McLeod patents is provided, i.e. a truck having a small opening or delivery port provided in the tailgate (which is typical of grain delivery trucks). The tailgate impedes the sliding or tumbling action of the graff and provides a "choke point" that impedes smooth graff flow.

2) A quantity of graff can be removed from the bottom of a pile of graff, or a container (e.g. a silo) full of graff, provided that essentially the entire lowermost layer (or an inner layer) of the graff is removed all at one time, rather than just a part of the graff from the lowermost layer (or any inner layer) as has been done conventionally. This can be achieved by moving a conveyor surface or a series of elongated transverse elements (rakes or slats) beneath the pile or contained body of graff, while preferably maintaining the remainder of the body of graff essentially stationary in some way. If essentially the entire lowermost layer of the graff is removed, the remainder of the graff can move downwardly without binding or bridging. If it is desirable to prevent the remainder of the graff from moving as the lowermost layer is withdrawn (which is the case if a constant supply of graff is to be delivered to a piece of equipment, such as the cleaning mill), the remainder of the graff may be confined within a container or behind a retaining wall, or the body of graff may be supported on an upwardly sloping surface so that the weight of the body of graff prevents it from following the movement of the removed layer.

3) Graff can be caused or "encouraged" to flow bodily from one point A, e.g. a point of delivery within a container, to another point B by moving an upper layer of a body of graff from point A towards point B. This is best used in conjunction with 2), i.e. the moving of a lower layer of material from point A to point B (without of course attempting to prevent the movement of the body of graff as is done in some forms of 2). This can be done, for example, by providing augers at an upper level of the body of graff, and is particularly useful within a graff harvesting unit where graff is collected a the front of a container and has to be moved to an outlet region or well at the back of the container.

4) Graff can be conveyed in a current of air of suitable volume and velocity, but this may cause some separation of the components of the graff. However, such separation is desired in certain parts of the system, e.g. in the cleaning mill, so movement of graff in this way tends to be confined to such system parts.

5) Graff can, of course, be moved bodily as a single mass, e.g. on a horizontal moving surface (e.g. a conveyor). This is useful, for example, for emptying graff from a rear well of a harvester unit, or the like.

A practical application of these observations has already been suggested in FIG. 1 of the present application in that the cleaning mill 20 is provided with an integral graff receiving unit 21. This is sized to receive the entire contents of a delivery truck, which can consequently dump its entire load of graff through its open tailgate (which may be hinged at the top or bottom to allow it to be swung out of the way). As will be apparent from the following description of preferred versions of the cleaning mill described below, the receiving unit is specially designed to raise the deposited graff to an elevated entrance of the cleaning mill without encountering problems caused by the poor flow characteristics of the graff.

Thus, an important aspect of the present invention is to avoid the need for temporary storage of the graff by allowing for a full load of graff from at least one delivery vehicle to be delivered at once to a graff receiving unit of a cleaning mill, which unit can then deliver a regular supply of the graff to an elevated input opening of a cleaning mill. If this is done, and if the rate of cleaning of the graff in the cleaning mill is sufficiently rapid, the graff may be transferred from the harvesting unit, directly to the delivery vehicle and then directly to the cleaning mill without any intermediate storage of any kind, thus avoiding problems encountered with the use of conventional storage silos and the like. Temporary storage may of course be provided by the delivery vehicles themselves, in that if the harvesting rate were to exceed the cleaning rate temporarily, the temporary excess of graff could be held in a sufficient number of delivery vehicles, if needed, and provided such vehicles were available. Clearly this is to be avoided if possible, but could provide a temporary solution to overflow problems.

Another important aspect involves the design of the harvesting unit to make best use of the principles of graff flow described above.

Yet another important aspect of the invention involves the design of the cleaning mill that makes efficient use of movement and separation of graff, at least in part by the use of air currents.

Yet another important aspect of the invention involves the design of the harvester unit that allows it to be towed by a conventional vehicle, e.g. a tractor. While this has nothing to do with the flow properties of graff itself, it is important for the overall economy of the present invention as such vehicles tend to be less expensive to manufacture and to operate. A special hitching arm has been developed for this purpose.

With these basic concepts in mind, a description of preferred embodiments of the novel components of the graff harvesting system of the invention will be provided below.

Improved Graff-Harvesting Harvesting Unit

For even greater efficiency and effectiveness of harvesting, improved harvesting units have been developed according to the present invention. These harvesting units may be used in the harvesting method indicated above or in other harvesting methods, e.g. as disclosed in U.S. Pat. No. 5,873,226.

Various graff-harvesting harvesting units are disclosed in U.S. Pat. No. 5,794,423. These harvesting units are effective, but they are expensive to manufacture and can be cumbersome and difficult to operate. Moreover, because of the difficulties in making graff flow evenly, the material flow through the known harvesting units may not always be optimum. The preferred harvesting unit of the present invention overcomes these problems to a desirable extent.

Farmers in recent years have become used to self-propelled harvesting units, such as conventional combine harvesters. Several of the harvesting units disclosed in U.S. Pat. No. 5,794,423 are of the self-propelled kind. However, the required motor, driving controls and steering mechanisms add considerably to the cost of such vehicles. U.S. Pat. No. 5,794,423 also discloses non-powered (pull-type) harvesting units (see, for example, FIGS. 4 to 10 of the patent), but these are of the "wrap-around" kind, i.e. the harvesting header is positioned in front of a propulsion unit (tractor), while the remainder of the harvesting unit is positioned to the side or rear of the propulsion unit. This leads to a mechanically complicated, cumbersome and expensive designs.

The harvesting unit of the present invention is based in part on the concept of providing a pull-type unit for cost-reduction (most farmers already have their own tractors or other suitable propulsion units) while avoiding the complexity of the wrap-around design by towing the harvesting unit at the rear of the propulsion unit. However, this creates a problem in that, if the harvesting unit is towed behind a tractor, there is difficulty in providing a suitable means of attachment between the two since the harvesting header (particularly a direct-cut header) is necessarily positioned immediately behind the tractor hitch point, making a conventional tow bar impossible to use and blocking access to the tractor's mechanical and hydraulic power supplies. The header also has a cutter bar that must be raised, and this imposes a further constraint on any towing system. This difficulty has been overcome according to the present invention by providing a harvesting unit having a novel hitching arm.

Figure 2:
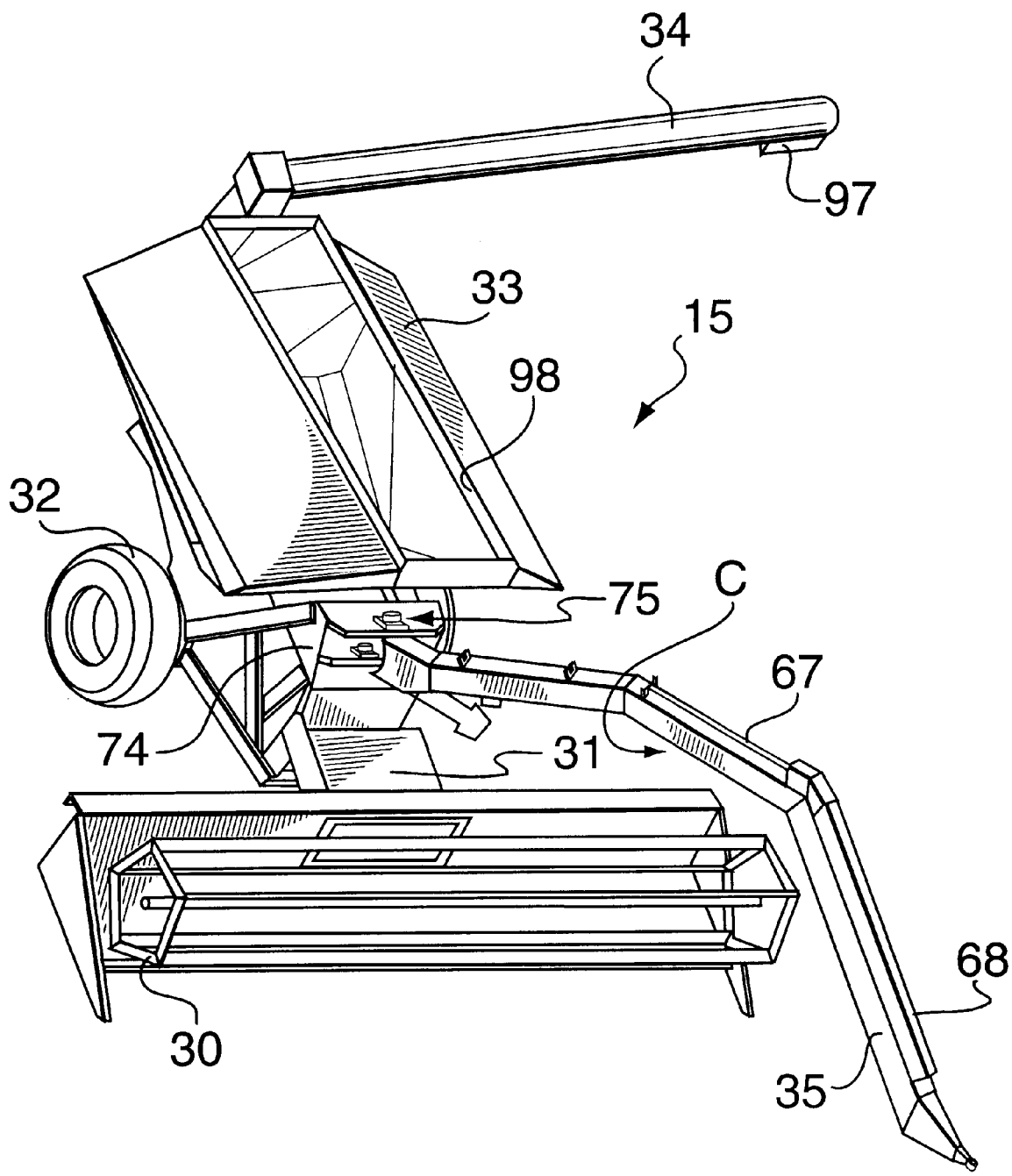
FIG. 2 is a perspective view of a preferred embodiment of a harvesting unit suitable for use in the method of the invention.

A first preferred embodiment of the improved harvesting unit 15 is shown in perspective view in FIG. 2 of the accompanying drawings. As shown, the harvesting unit 15 comprises a harvesting header 30, that may be of either the direct-cut type (e.g. a conventional header, normally 7.3 to 9 m (24 to 30 feet wide)) or a swath pick-up header (normally 4.25 m (14 feet) wide). A crop feeder housing 31, e.g. a chain feeder, feeds the cut crop rearwardly to the harvester body containing the unit's internal threshing mechanism, described in more detail later, where the cut crop is separated into stalks (which are returned to the field as straw) and graff (a mixture of grain, chaff and weed seeds, etc.). The body of the harvester unit also contains a graff holding container or tank 33 to which graff is transferred after being collected from the threshing mechanism. When the tank 33 is full, the unit 15 is stopped (or unloaded on-the-move), and the graff is transferred to a transport vehicle 17 (not shown in this view, but see FIG. 1) via an unloading auger 34. The harvesting unit 15 is pulled on unpowered wheels 32 by a conventional tractor 16 (not shown in this view, but see FIGS. 1 and 3) via a hitching arm 35 that not only acts as a tow bar, but also supplies mechanical and hydraulic or pneumatic power to the harvesting unit 15 from the tractor and provides a steering function.

In the harvesting unit of the invention, at least in preferred forms, several factors combine to make the use of the illustrated hitching arm possible. Unlike a regular combine harvester, the harvesting unit does not contain a grain cleaning apparatus (because it is intended to harvest graff), which means that the threshing cylinder 30 may be positioned closer to the ground. The grain feeder housing 31 from the cutter head to the threshing cylinder may also be made quite short as a result (e.g. about 1.2 m (four feet)), and this allows the harvester to be located closer to the tractor, and means that the cutter head does not have to be raised very much in the stowed condition. In consequence, the hitching arm 35 may be quite short and the cutter head 30 easily fits within the "crook" of the hitching arm in the raised condition.

Figure 3:
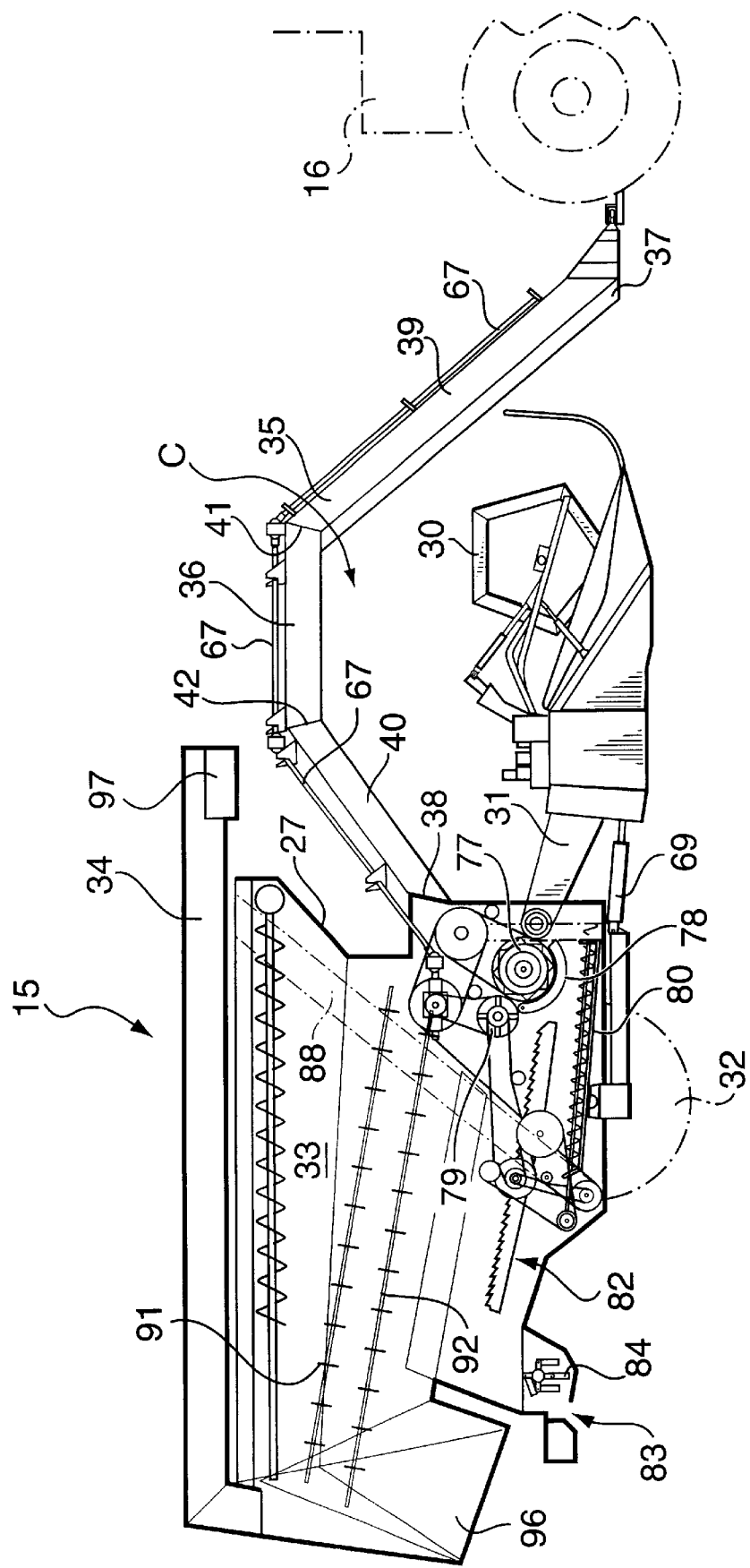
FIG. 3 is side view, with internal elements visualized, of the preferred harvesting unit of FIG. 2.

In a first embodiment, the hitching arm 35 has a closed-in hollow tubular design and, in side view, as best shown in FIG. 3, it has a centrally-raised shape (referred to for convenience in the following as an "inverted U-shape", although it is realized that this is a very loose description a more accurate description would be that the hitching arm is elongate with two opposite ends; the arm ramps or rises upwardly from each end towards the centre of the arm, and the arm has a short, elevated, generally horizontal section between the ramped or raised sections at in the middle of the arm). The inverted U-shape allows the crook C (upward bend) of the hitching arm to extend over the top of the harvesting header 30, with enough clearance to allow the header to be raised to the elevated (stowed) position shown in FIG. 3. This generally means that the crook C, at its highest point, must be elevated by a distance of at least 3 m (10 feet) from the ground. The length of the hitching arm 35 must also be suitable to prevent it fouling the harvesting header 30 during normal harvesting, even when the harvesting unit 15 is steered out of direct alignment with the tractor 16 (as will be explained later). This usually means that the hitching arm must project horizontally by at least about 6.5 m (21 feet). However, the hitching arm should preferably be no longer than necessary to achieve this objective in order to minimize turning moments (that may overwhelm the steering mechanism of the tractor if they become too great) when the hitching arm is moved to one side of the tractor or the other. For comparison, a hitch that would have to be used for a pull-type combine harvester would have to be longer and stronger, i.e. at least 10 m (33 feet) in length, because of the added weight of the combine. This makes it extremely difficult or impossible to control side forces in a non-aligned cutting operation. The maneuverability would therefore be lost with such a machine.

Since the hitching arm must pull quite a heavy load (the harvesting unit plus harvested graff), and since it is of inverted approximately U-shape as shown, forces encountered during harvesting will tend to pull the ends 37 and 38 of the hitching arm towards or away from each other. The hitching arm should therefore be made sufficiently strong and rigid that significant flexing of this kind is prevented. In the illustrated embodiment, the hitching arm is made of three main tubular elements of square cross-section, 36, 39 and 40, that are welded together at their interconnecting joints 41 and 42. A heavy gauge steel box construction is suitable for this purpose.

Figure 4:
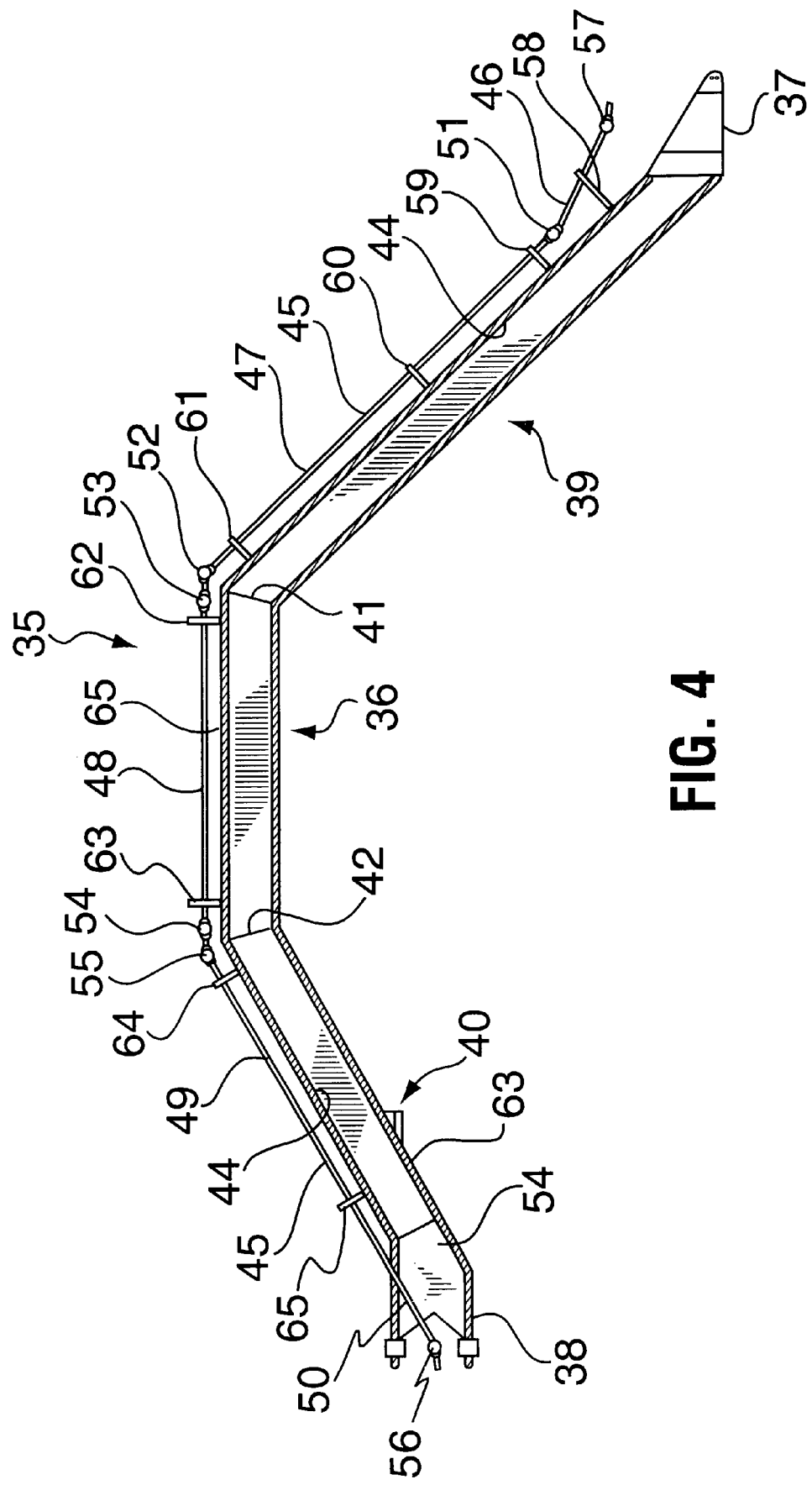
FIG. 4 is a side view in cross-section of a hitching arm of the harvesting unit of FIGS. 2 and 3.

The hitching arm 35 is shown in isolation and in longitudinal cross-section in FIG. 4. The interior 44 of the hitching arm 35 forms an enclosed channel which may be used, if desired, to accommodate hydraulic and electrical lines (not shown) extending between the tractor and the harvesting unit. Generally, the hydraulic system includes three hydraulic sets, one for pivoting the header 30, one for turning the header, and the third for raising the header. The hydraulic cylinder 69 used for raising and lowering the harvester head is visible in FIG. 3.

The top edge of the arm is used for guiding a mechanical driveline 45 that conveys rotary motion from the tractor's mechanical drive to the harvesting unit where it is used to drive the harvesting header 30 and other components. The driveline consists of several straight shafts 46, 20 47, 48, 49, 50 interconnected at their ends by means of constant velocity joints 51, 52, 53, 54 and 55. Alternatively, the joints may be interlaced pairs of U-joints. The ends of the driveline may also include constant velocity joints 56, 57 for connection to the mechanism of the harvesting unit and the tractor, respectively. Suitable bearings 58, 59, 60, 61, 62, 63, 64, 65 are provided on the upper surface of the hitching arm to secure the driveline and to ensure that the shafts rotate smoothly. The constant velocity joints employed for this purpose are preferably capable of operating at angles up to 17° and of handling power transmission of up to 150 kW (200 hp). The use of constant velocity joints in the driveline not only means that the driveline may follow the inverted U-shape of the hitching arm 35, but also (because of the constant velocity joints 56, 57 at the extreme ends of the driveline) makes it possible that the hitch arm may be moved out of direct alignment with the tractor or the harvesting unit without damaging the mechanism.

The driveline may be enclosed by an elongated cover 68 (shown in part in FIG. 2) in the form of an inverted channel section that fits over the upper edge of the hitching arm.

Figure 5:
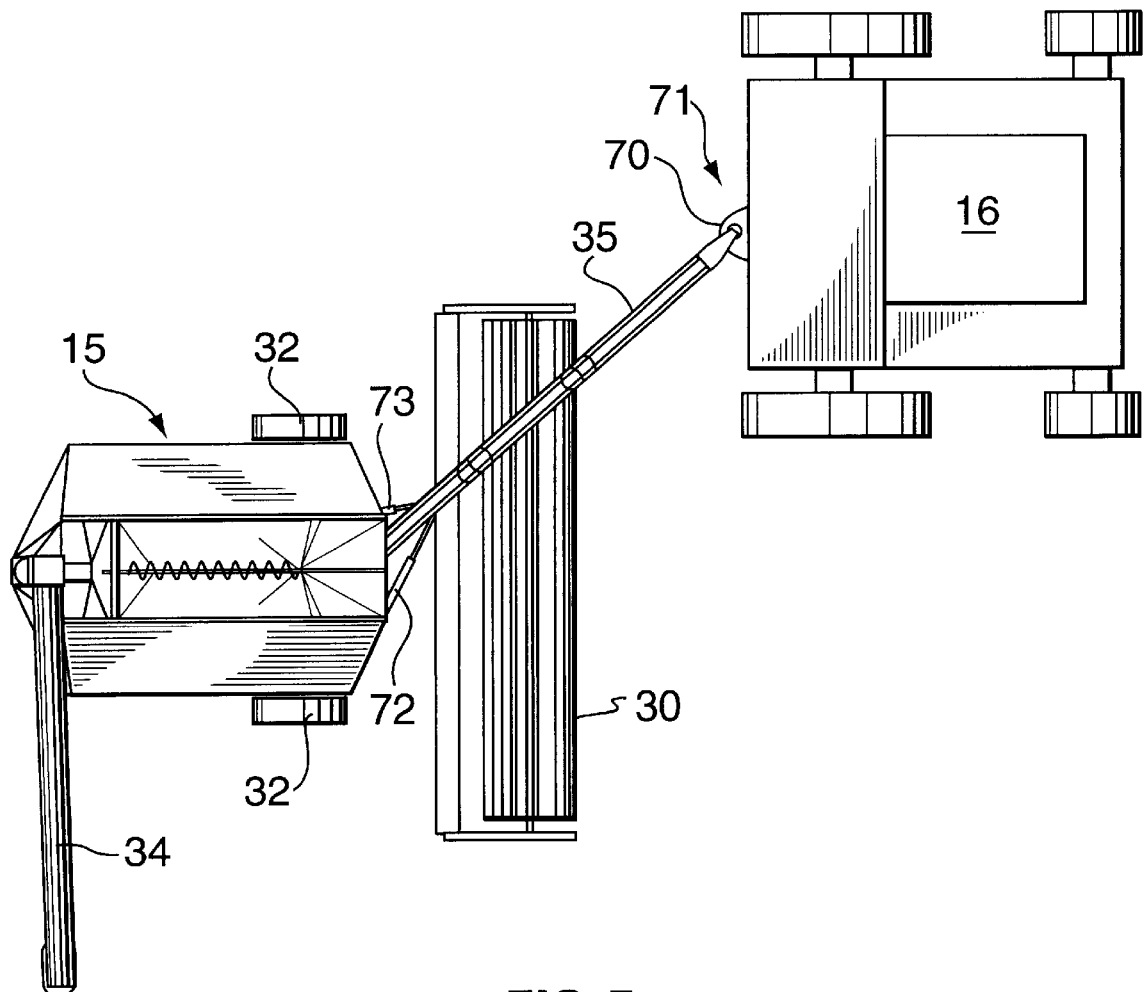
FIG. 5 is a top plan view of a harvesting unit according to FIG. 2 and FIG. 3 showing the method of attachment to a conventional tractor.

As shown in FIG. 5, the hitching arm 35 is connected to a drawbar 70 of the tractor 16 via a conventional hitch 71. At the opposite end, the hitching arm 35 is connected to the harvester unit 15 via a "hydra-swing" hitch, which includes a pair of hydraulic cylinders 72 and 73, attached to the body of the harvester unit 15, that allow the hitching arm 35 to be kept in direct alignment with the tractor 16, or moved to one side or the other, as shown. This sideways movement, which can be controlled by the operator of the tractor, allows the tractor itself to remain largely clear of the unharvested crop, and allows the harvesting unit to be swung from one side of the tractor to the other to facilitate back-and-forth harvesting of the crop. On the other hand, by positioning the harvesting unit directly in line with the tractor, the overall width of the equipment may be minimized (for passing through gates, and the like).

At its opposite end, the hitching arm 35 is connected to a frame element 74 of the harvesting unit for rotation about a generally vertical axis by means of a vertical pivots 75 (see FIG. 2). This allows the harvesting unit 15 to remain in a forward-facing direction, i.e. facing in the same direction as the tractor, when moved to one side or the other out of direct rearward alignment with the tractor. The unpowered wheels 32 on which the harvesting unit 15 rides are not steerable, and these wheels tend to keep the harvesting unit moving in the same direction as the tractor, even when the harvesting unit is moved to one side of the tractor or the other.

As will be appreciated, the tractor 16 both powers and maneuvers the harvesting unit 15. For most applications, a standard 125 kW (165 horse power (hp)) tractor with a 95 kW (125 hp) power take off (PTO) with three hydraulic couplings and suitable transmission speeds will be suitable to operate the harvesting unit 15.

As mentioned earlier, graff has proven to be an extremely difficult material to handle because it does not flow easily and because it is bulky and is produced in large amounts. The threshing and storage mechanism of the illustrated harvesting unit 15 is intended to overcome the difficulty of collecting and processing of graff.

As shown in FIG. 3, a chain-type crop feeder housing 31 conveys cut crop material into the interior of the harvesting unit 15 where the crop material encounters a rotating threshing cylinder 77 and a perforated concave 78 that, in conjunction with a rear flanged beater roll 79, subject the crop material to a severe threshing action. The separated grain, chaff and weed seeds (i.e. graff) fall through the perforated concave 78 and collect on an auger bed 80, i.e. an inner flat surface of the harvesting unit beneath the concave provided with several narrow augers extending front to back. The rest of the crop (stalks and remaining grain, etc.) is then passed from the cylinder 77 to an arrangement of straw walkers 82 which separate any remaining graff from the stalks. The graff separated in this way also falls onto the auger bed 80. In the harvester unit 15 of the present invention, the feeder house 31 and straw walkers 82 may be made considerably shorter than those used in a conventional combine harvester (e.g. only 1.2 m (4 feet) long for the feeder house, and 1.8 m (6 feet) long for the straw walkers, as opposed to 3 m (10 feet) in a combine harvester). This allows a more compact unit to be constructed, and the short feeder housing 31 allows the cutter bar of the header to fit under the crook C of the hitching arm when in the raised position. The threshing cylinder 77 is also very low, i.e. much closer to the crop than in conventional harvester designs. This allows the hitching arm 15 to be made quite short (e.g. 6.5 m (21 feet)). The shorter length makes possible the unique shape of the hitching arm and, in turn, the unique shape makes it possible for the header to be raised and lowered inside the crook of the hitching arm.

The stalks are moved by the straw walkers to the rear of the harvesting unit 15, where they are discharged onto the ground through a discharge opening 83 either as a swath or as small pieces formed when the stalks encounter an optional straw chopper/spreader 84. As noted, the graff separated by the straw walkers 82 falls through the straw walkers to the bed 80 of the harvesting unit.

Figure 3A:
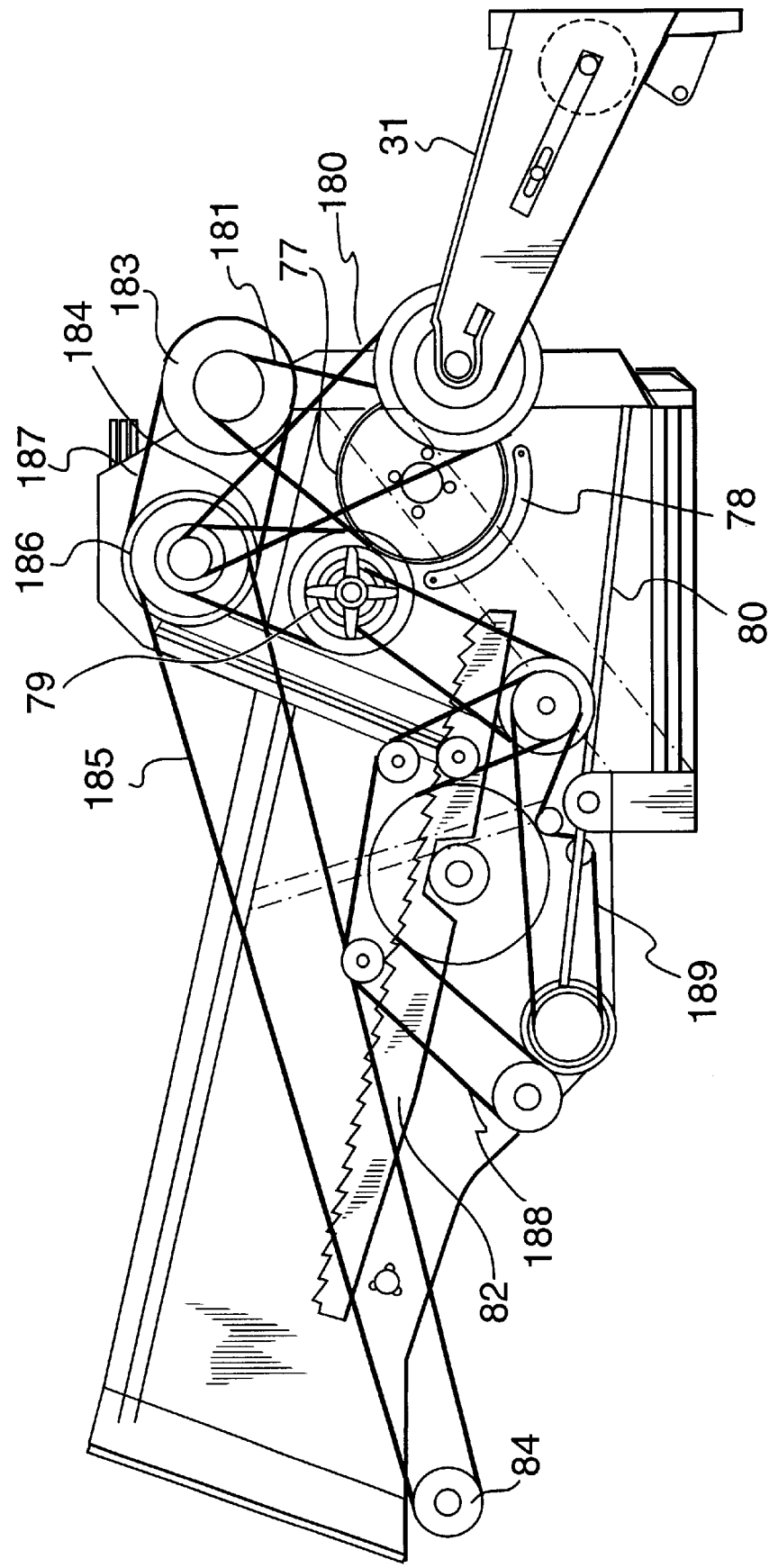
FIG. 3A is a view similar to FIG. 3, showing the threshing mechanism and graff collection area in isolation.

The threshing and graff collection section of the harvester unit 15 is shown in isolation and increased size in FIG. 3A, in particular showing the various pulleys and drive belts and chains. The feeder of the feeder housing 31 is driven by feeder drive belt 180, and the cylinder 77 is driven by cylinder drive belt 181. Element 182 is a variable drive belt driven by the main pulley 183. The beater 79 is driven by a beater drive belt 184, and chopper 84 is driven by chopper drive belt 185. A secondary counter shaft 186 is driven by a secondary shaft drive belt 187. The straw walkers 82 and auger bed 80 are driven by drive belt 188. Element 189 is a conveyor drive chain.

Figure 6:
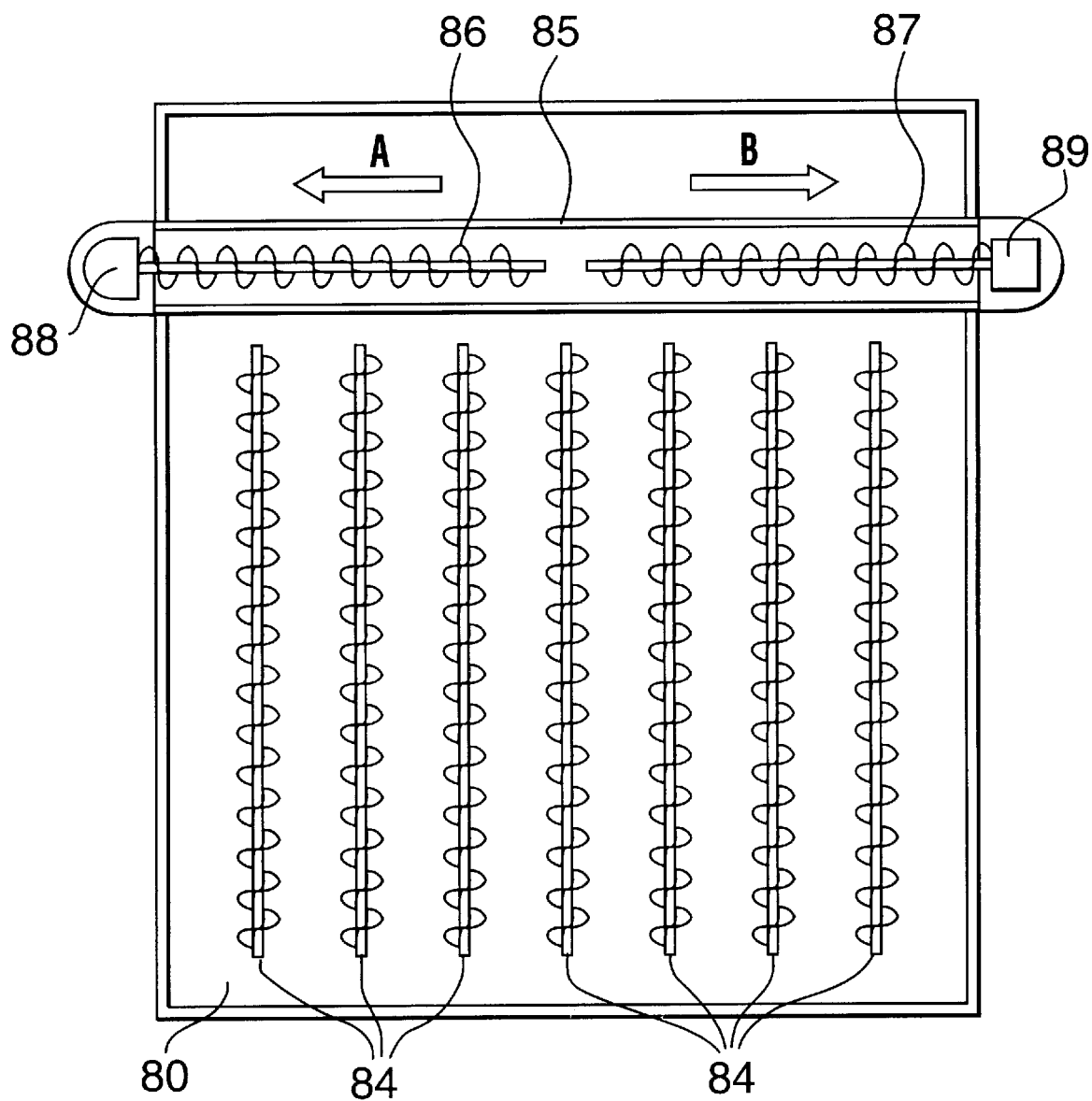
FIG. 6 is a top plan view of an auger bed, shown in isolation from other equipment, as used in the harvesting unit of FIG. 2 and FIG. 3.

The auger bed 80 is shown in plan view of FIG. 6 in isolation from the other elements of the harvesting unit. The bed 80 slopes upwardly slightly from front to rear, but the graff, as it collects, is moved from below towards the rear of the bed by a set of several rotating augers 84 provided just above the surface of the bed 80 and orientated in parallel from the front of the bed to the back and across the entire width of the bed. The graff is thus moved bodily towards the rear and encounters a transverse channel 85 containing a pair of coaxial cross augers 86, 87 that move the graff in opposite outward directions shown by arrows A and B towards vertical paddle elevators 88, 89. The storage tank 33 of the harvesting unit 15 (see FIG. 2) is positioned immediately above the collection bed 80 with enough vertical clearance for the augers 84 and the collected graff.

It is to be noted that, unlike many combine harvesters, the harvesting unit 15 lacks grain cleaning apparatus and a mechanism for returning unthreshed heads to the threshing cylinder. This makes it possible to design a harvesting unit having a low profile because the storage tank 33 may sit low over the auger bed 80, and it also results in a power saving since material is not being recirculated through the threshing mechanism. This further simplifies the harvesting unit of the present invention and makes it mechanically more reliable than a conventional combine harvester. In the apparatus of the invention, unthreshed heads are collected with the graff and become part of the millings, as described later.

Figure 7A:
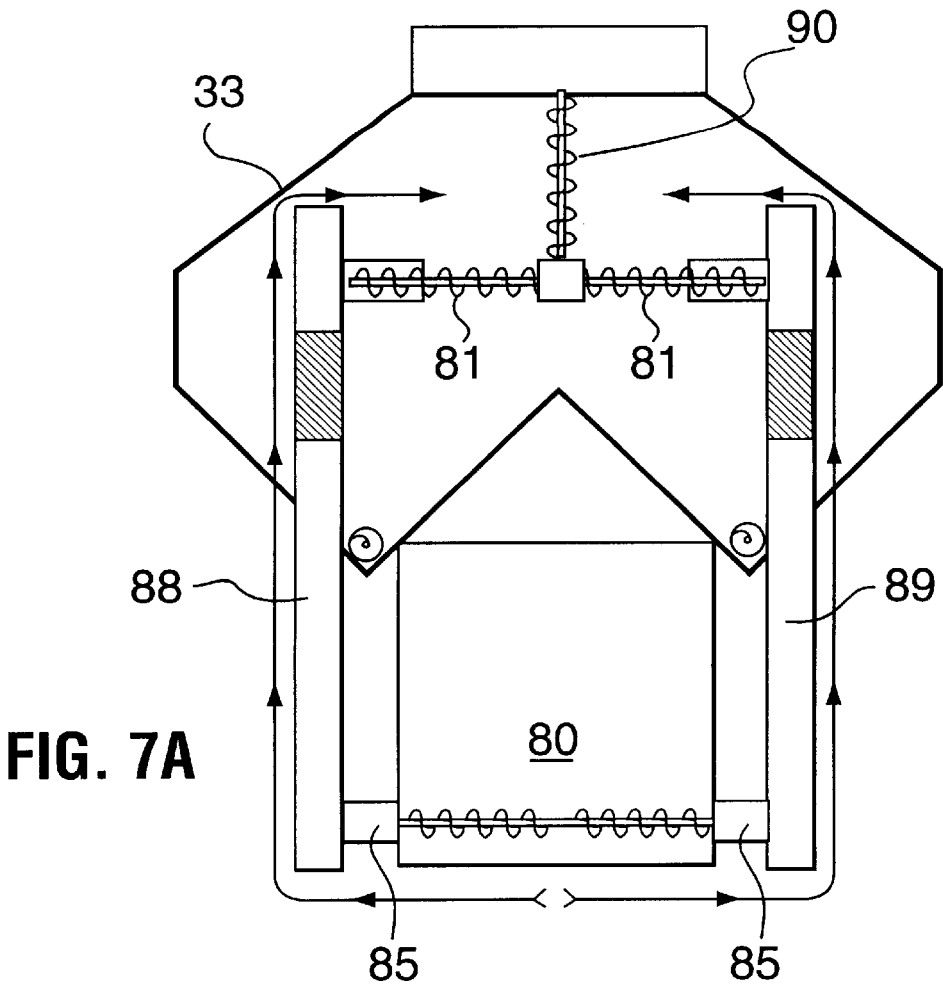
FIGS. 7A, 7B, 7C and 7D are simplified cross-sectional view of the harvesting unit of FIG. 2 and FIG. 3, showing how graff is lifted into and moved within the graff storage tank.
Figure 7B:
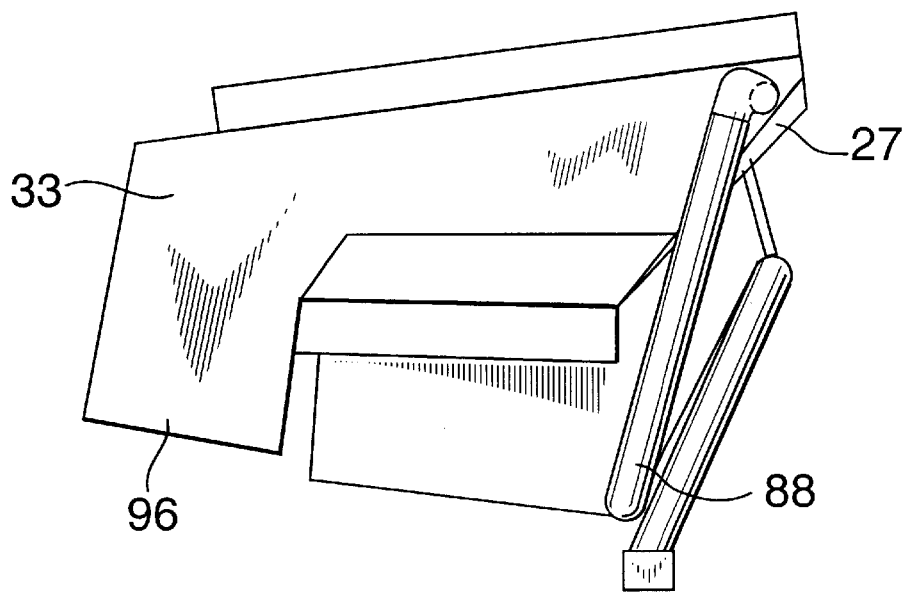
Figure 7C:
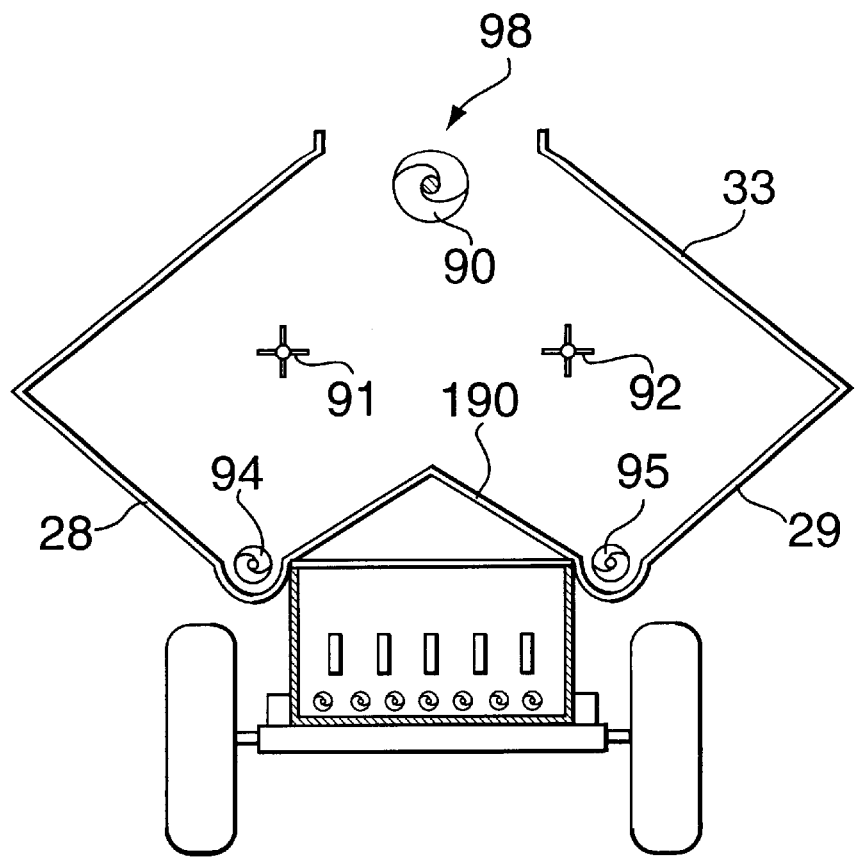

As noted, the graff from the auger bed 80 is elevated to the height of the top of the storage tank 33 by a pair of paddle elevators 88 and 89 (see FIG. 3 and FIG. 6) for the graff located at the ends of the trough 85 on each side of the storage tank 33. FIGS. 7A, 7B, 7C and 7C are diagrams showing how the graff is raised into the tank 33, moved therein and removed therefrom. As shown in FIGS. 7A and 7B, the graff elevators 88 and 89 are positioned on the outside of the unit at their bottom ends and they extend upwardly and forwardly. The fact that two elevators 88 and 89 are provided means that a large volume of graff from the collection bed 80 can be accommodated at opposite sides of the tank, ensuring a regular flow of graff from the collection bed and into the storage tank at opposite sides, as shown by the arrows in FIG. 7A. At a point midway between the lower and upper ends, the elevators pass inside the tank 33, the entrance areas being shown by shading in the drawing. The elevators discharge within the tank 33 at the upper front end.

A pair of inwardly-directed augers 81 move the graff to the middle of the tank where another auger 90 is provided to help distribute the material to the rear.

FIG. 7C shows the inside of the storage tank 33 at a point behind the elevators 88, 89. The tank has a unique shape designed to minimize problems caused by the poor ability of graff to flow. Various augers are provided to keep the graff moving as required within the tank. The tank is provided with a horizontal leveling auger 90 at the top to move the graff backwards and to prevent the formation of a central peak. A pair of rotating agitators 91, 92 are provided lower in the tank to help prevent bridging within the body of graff. These agitators are generally horizontal but slope slightly upwardly towards the rear as shown in FIG. 3. At the bottom of the tank 33, a pair of delivery augers 94, 95 are provided to move the bulk of the graff rearwards towards a well 96 (see FIG. 7D), i.e. a deeper section of the tank, formed at the rear of the tank (see FIG. 3). The lower wall 190 of the tank 33 is in the form of an inverted V so that the graff is directed toward transport augers 94 and 95. The well 96 forms the lowest collection point for the graff and is thus the last section of the tank to be emptied by an unloading auger 34, the bottom end of which is positioned at the bottom of the well 96. The auger 34 is actually made up of two co-operating augers, i.e. a vertical auger positioned in the well 96 that lifts the graff out of the well 96 and a horizontal auger that moves the graff to downward facing, preferably flexible, delivery spout 97. The well 96 form a hopper which contains an exposed inclined section of flighting 99 which draws graff into the vertical, then horizontal, sections of the unloading auger. The unloading auger may be centered along the top of the storage tank 33 during harvesting, and may be swung to either side or to the rear for discharge of the graff into a waiting vehicle 17. The unloading augers are preferably of large diameter compared to those for unloading grain from combine harvesters. For example, the vertical auger may have a diameter of 41 cm (16 inches) or more and the horizontal auger may have a diameter of 35.5 cm (14 inches) or more. This allows for a very rapid emptying of the tank, i.e. in the region of three minutes.

All of the various augers and agitators are driven by mechanical transmissions (e.g. belts and pulleys) taking power from the rotating shaft carried by the hitching arm 35.

The storage tank 33, which is preferably of approximately 21 m3 (750 cubic feet) in capacity (at least twice the size of the collection bin of the largest conventional combine harvester) and (as noted above) preferably has the same size as a truck box of the vehicle 17, is preferably provided with a particular shape that facilitates the storage and movement of the graff. As shown in FIGS. 7A, 7B, 7C and 7D, the front wall 27 and lower parts of the side walls 28, 29 of the tank slope inwardly from the top to the bottom. The angle of slope is preferably made at least 509 relative to the horizontal, so that the graff slides towards the bottom of the tank and does not become trapped at the base of the front and side walls in the form of stagnant piles. This feature makes use of the observed ability of graff to slide freely down a slope having a suitable angle of inclination. The sloping front wall 27 also allows the tank to clear the hitching arm 35 and allows better weight distribution.

Although the storage tank 33 is designed to hold a substantial amount of graff, the low density of this material means that the tank does not have to be unusually strong, so there is no need for cross-bracing of the walls, or the like. In fact, the sculptured (tapering) shape of the tank increases its structural strength relative to a rectangular tank of the same capacity.

The tank preferably has an open hatch 98 (FIG. 7C) on the top surface that may be covered when desired by a roll-back tarpaulin (not shown) or the like. This allows access to the interior of the tank for maintenance and to clear blockages.

It has been found advantageous to coat the inside of the tank 33 and auger chutes with a paint that forms a low friction surface in order to minimize binding of the graff at the sides of the tank. Preferably, the paint should provide a surface having a co-efficient of friction of less than about 0.45. Paint containing powdered graphite (e.g. paint sold by Acu Mech Sys Enterprises Ltd., under the trademark SLIP-PLATE®) is particularly effective in this way.

Figure 8:
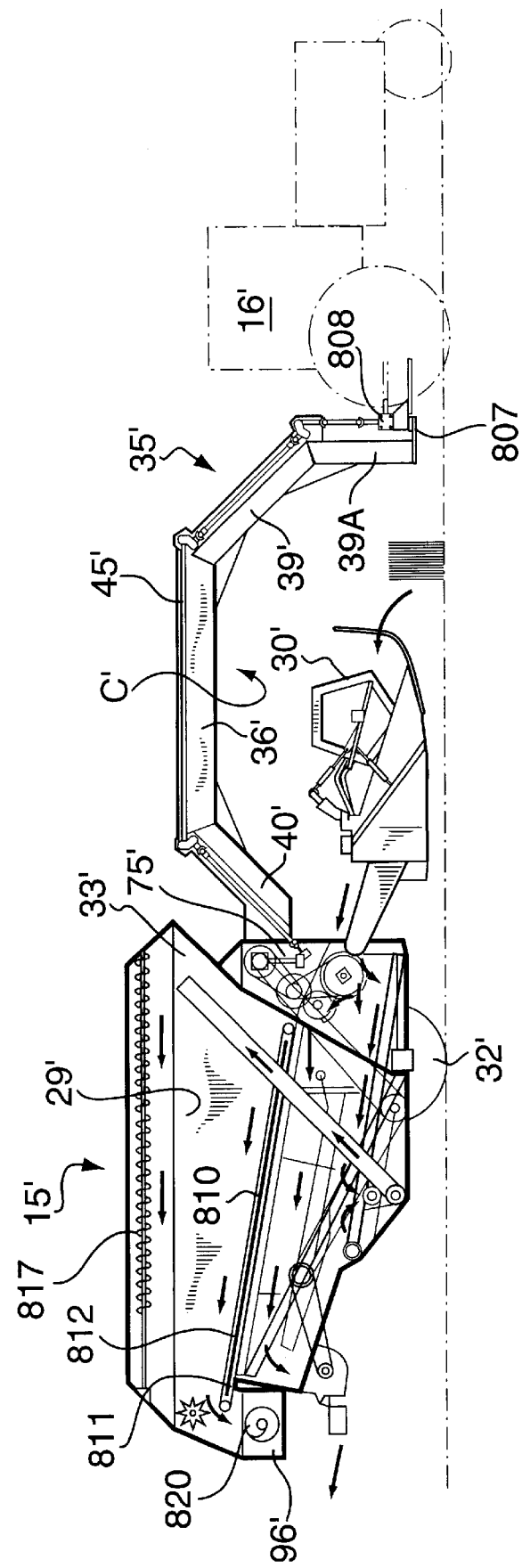
FIG. 8 is a side elevation of an alternative preferred embodiments of the harvesting unit and hitching arm of the present invention attached to a conventional tractor.

FIG. 8 is a side view of an alternative preferred embodiment of the harvesting unit and hitching arm of the present invention. In the description of this embodiment, elements that are identical or equivalent to those of the previous embodiment are identified by the same reference number with an added prime (e.g. 15 becomes 15').

Figure 8A:
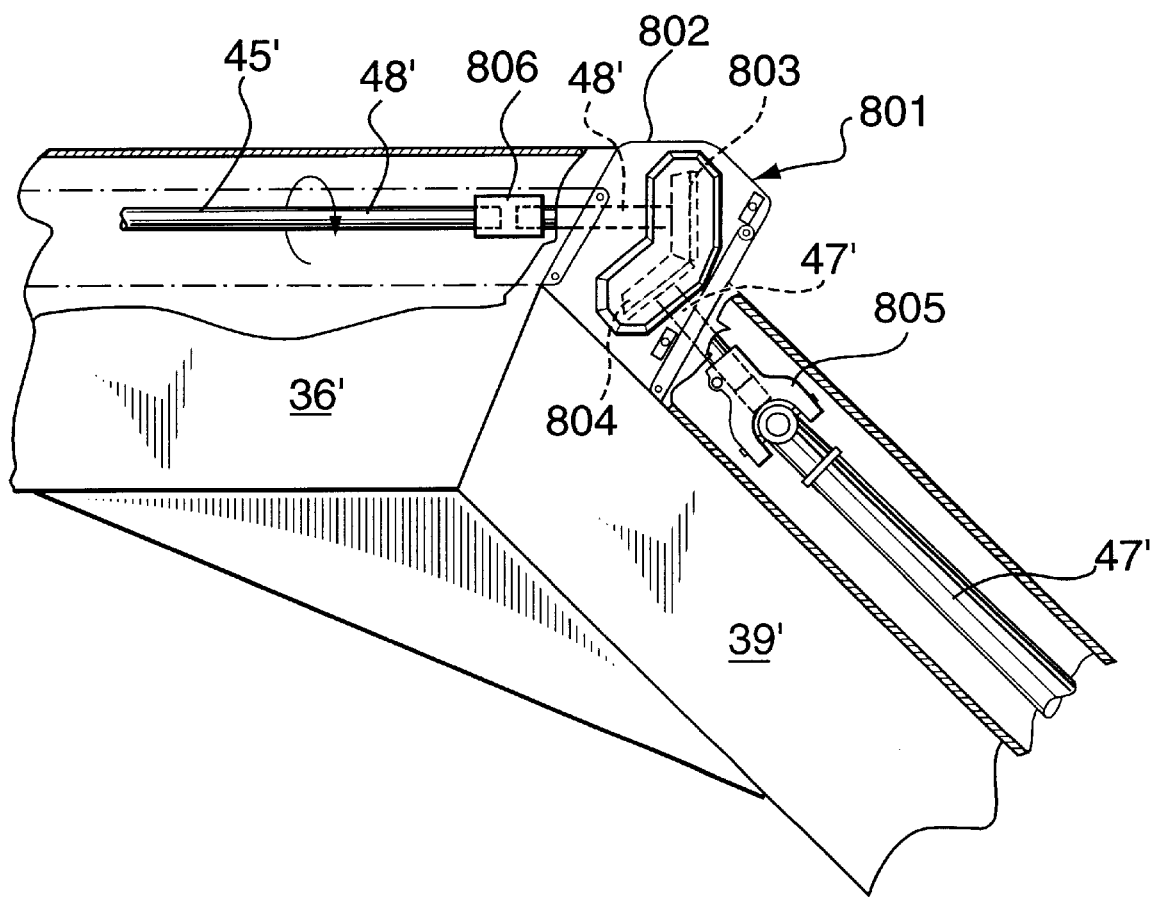
FIG. 8A is an enlarged view, partly in cross-section, of a joint in a power transmission line carried by the hitching arm of FIG. 8.
Figure 8B:
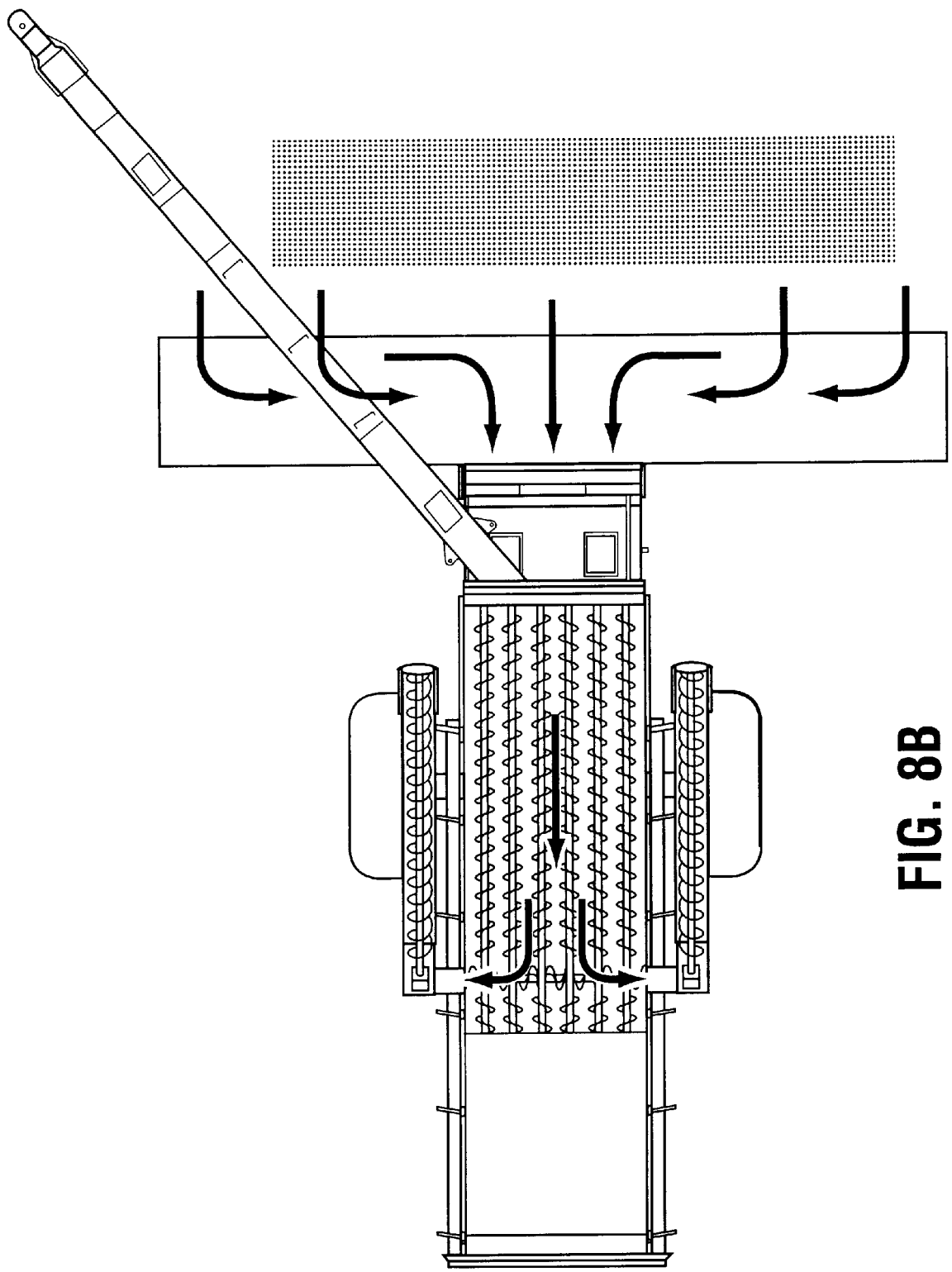
FIG. 8B is a top plan view of the harvester of FIG. 8 showing a horizontal section immediately beneath the graff storage tank and straw walkers, showing the augers used to move the graff and the direction of graff flow (indicated by arrows)

It will first of all be noted from FIG. 8 that the hitching arm 35' is made up of four sections rather than three, these sections being 36', 39', 40' and an additional vertical section 39a at the tractor end of the hitching arm. The presence of the additional section gives the arm a greater approximation to the inverted U-shape mentioned earlier and provides greater "headroom" C' above the harvesting header 30' to allow the header to be raised fully to the inactive position, and also allows more room for the harvesting header in the operational position during swinging of the harvester unit 15' out from one side of the tractor 16' or the other. Depending on the materials of construction, this embodiment may encounter slightly more flexing during use than the hitching arm of the previous embodiment, the total amount of flexing being about 0.3 m (1 foot) between the opposite ends, and so this degree of flexing must be accommodated by the mechanical drive line 45'. This can best be done by providing U-joints at the points where the drive line bends to follow the shape of the hitching arm, and also by providing slip joints (splined telescopic sections) within the driveline itself to accommodate lengthening and shortening actions of the line. As a alternative to using U-joints for this purpose, it is also possible to use gearbox designs to achieve the required change of angle. A suitable gearbox design is shown in enlarged partial section in FIG. 8A, which shows the driveline 45' at the junction of arm sections 36' and 39'. The gearbox 801 consists of a housing 802 containing mutually-meshing rotatable beveled gears 803 and 804. The lowermost gear 804 is attached to driveline section 47' for rotation therewith and the uppermost gear is attached to driveline section 48' for rotation therewith. The angle at which the gears are mutually arranged creates the change of direction of the driveline 45' as it passes through the gearbox 801. A small degree of angular misalignment of the gears 803 and 804 is possible to accommodate flexing, and more is permitted by the presence of constant velocity joint 805 on one side of the gearbox and a slip joint 806 on the other side. The gearbox must be strong enough to transmit the power provided to the driveline 45' without distortion or overheating.

At the point of attachment of the hitching arm 35' to the tractor 16', a ball joint 807 is provided to allow sharp turns, and a gearbox 808 may be bolted to the tractor body.

In this embodiment, the hitching arm 35' is attached to the harvesting unit 15' at pivot 75' which is placed no more than about 1.2 m (4 feet) in front of the rotational axis of the wheels 32'. This positioning is important for two reasons. Firstly, the close proximity of the pivot 75' to the wheels means that easier turning of the harvesting unit by the hydraulic cylinders 72' and 73' (See FIG. 8C) can be achieved. Secondly, the centre of gravity of the harvesting unit is slightly to the front of the wheels when the unit is empty, but moves rearwardly of the wheels as the unit is filled during harvesting. This reduces the downward force on the hitching arm and allows the hitching arm to be of a lighter design than would otherwise be the case.

In this embodiment, the hydraulic lines from the tractor 16' to the harvesting unit 15' preferably follow the outside of the hitching arm 35' (rather than run through the hollow interior) for easier servicing, and the clearance of the cylinder can be adjusted from inside the tractor (along with all of the other hydraulic functions, preferably using a single-handed joystick design).

The harvesting unit 15' of FIG. 8 differs from the harvesting unit 15 previously described in several respects, as described in the following.

Figure 7D:
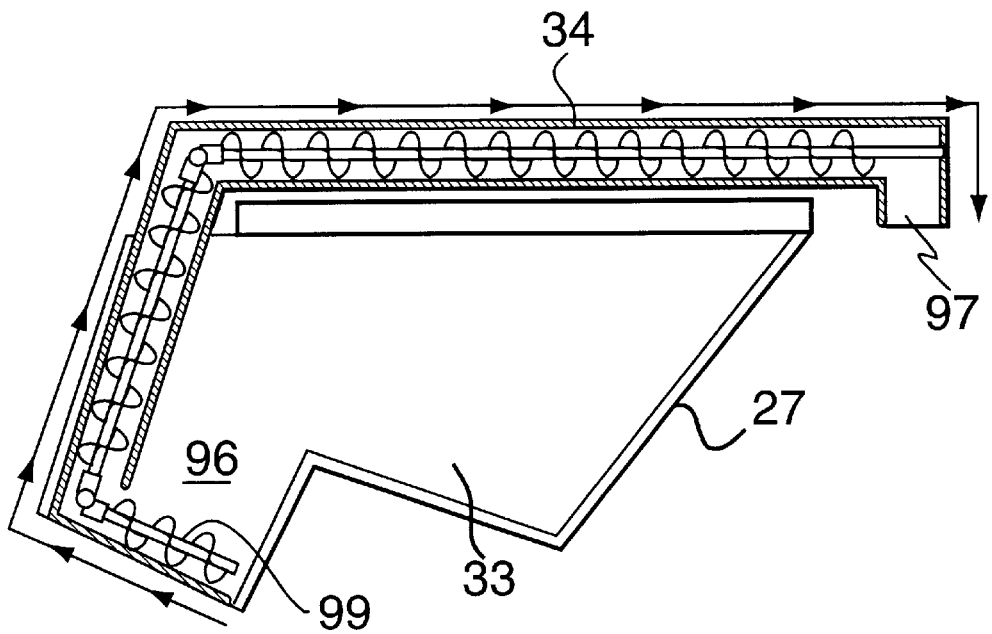

Firstly, instead of equipping the floor of the tank 33' with a series of parallel augers, as in the previous embodiment, in order to move the collected graff towards the rear of the tank, a "live floor" 810 is provided, i.e. an endless belt made up, for example, of mutually spaced transverse slats driven by chains. This makes use of the principal mentioned earlier that graff may be moved by moving or removing the entire lowermost layer of a body of the graff, i.e. a lowermost layer that extends completely across the width of the body of graff—in this case substantially the entire width of the tank 33'. In the previous embodiment, the intention was to deliver the graff as quickly as possible to a large rear well 96 positioned at the rear of the tank 33 from which the graff can be augered out as shown in FIG. 7D. In this second embodiment, the approach taken to graff removal is different. Instead of the large well 96, the tank 33' is provided with a shallow transverse well or channel 96' enclosing a quite large (e.g. 50 to 60 cm (20 or 24 inches)) generally horizontal transverse auger 820 or alternatively a conveyor belt). The live floor 810 slopes upwardly to the rear and thus the bulk of the body of collected graff tends to remain towards the front of the tank 33' and the movement of the live floor feeds a constant supply of graff into the channel 96' when the auger is operated, thus reducing the risk that binding will take place above the auger, or blockage of the channel 96' will occur.

The slats circulate around a plate 811 acting as a false floor of the tank and the slats themselves may be provided with flexible strips at the front to provide a sweeping action over the false floor. The chains 812 used to drive the slats (generally there are at least 2 and preferably 3 parallel chains) provide an open structure that is self-cleaning as it moves around the false floor. An alternative possibility would be to use a flexible (e.g. rubber) conveyor belt instead of the slats and chains, but material tends to build up underneath such arrangements, so they are usable but no preferred.

The transverse auger 820 in the channel 96' feeds a side-mounted hinged enclosed conveyor 815 or chute that is used to transfer the collected graff to an adjacent vehicle (not shown). The fact that the conveyor 815 is hinged means that it can be raised or lowered to a point just above the vehicle box. A conveyor is used rather than an auger to provide bodily transport of the graff supplied by the auger to prevent binding and blockage. The arrangement also allows the tank to be emptied quickly, e.g. within about 3 minutes or less.

A pair of augers 817 and 818 are provided at the top of the tank 33' in order to level the pile of graff (not shown)

collected in the tank. These help to move the body of collected graff towards the rear of the tank. A sensor (not shown) is provided to indicate when the tank 33' is full so that graff does not overflow into and build up above the channel 96' before the auger 820 can be operated to begin removal of the graff from the tank. Such overfilling could promote binding and blockage. The harvesting is interrupted when the sensor indicates that the tank is full and emptying commences, assuming that emptying is not being carried out simultaneously with harvesting (i.e. into a moving accompanying vehicle).

In this embodiment, the tank may be made larger than the previous embodiment and the lope of side walls 28' and 29' is made a minimum of 60°. The interior of the tank is again coated with low friction paint. The increased capacity may be obtained by increasing the height of the unit to 4.25 m (14 feet) and increasing its length (e.g. by approximately 1.5 m (5 feet)). This may result in a tank 33' having a volume of approximately 31.8 m³ (1120 cubic feet). While the tank 33' is generally made of sheet metal, such as steel, the tank may, alternatively, be made of plastic material as the graff load is light despite the large volume.

Cleaning Mill

To further improve the efficiency and effectiveness of the harvesting method, an improved cleaning mill 20 (often referred to as a yard plant) has been produced.

Figure 9:
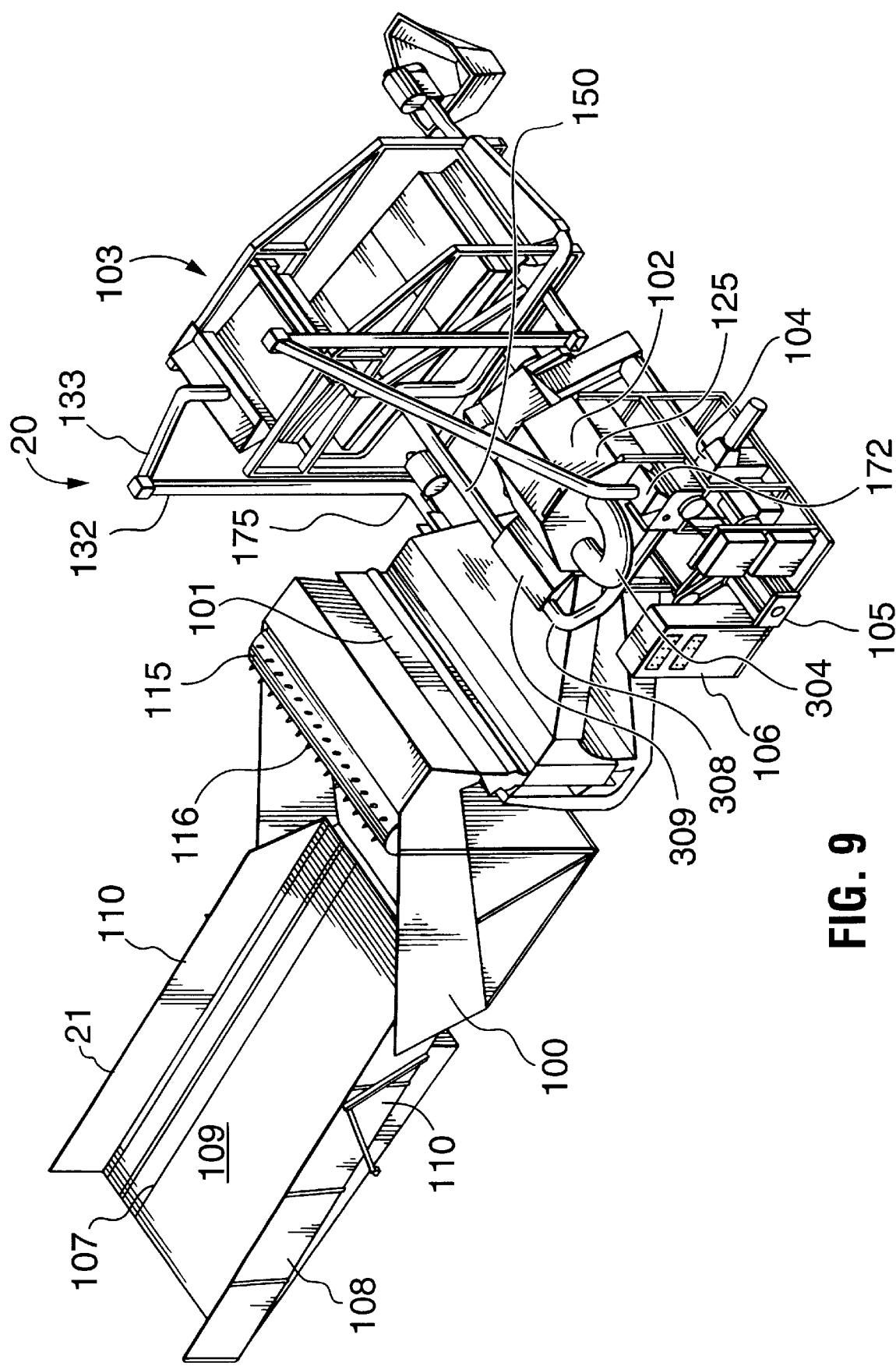
FIG. 9 is a perspective view of a preferred embodiment of a cleaning mill suitable for use in the method illustrated in FIG. 1.

The cleaning mill 20 is illustrated in perspective view in FIG. 9, from which it can be seen that the mill consists of several main parts, namely a drive-in graff receiving unit 21 (which acts as an open receptacle for the graff delivered by a vehicle) and graff conveyor 100, an aspirator 101 for removing chaff and light material from the graff, a millings collection unit 102, a screening unit 103, and a rolling mill 104. The aspirator 101 is powered by a Written Pole motor 105, or alternatively a diesel motor, and the mill is controlled by a computer module 106 (PLC).

Graff is delivered to the cleaning mill 20 directly from the field by a truck 17 (see FIG. 1). In the past, attempts were made to pour the graff through a small door positioned in the rear wall or gate of the truck box in the same manner that grain is delivered to a grain storage area. However, as noted above, graff does not flow in the same way as grain, and once deposited in a pile, it is difficult to pick up and convey to the cleaning mill. To overcome this problem, the illustrated cleaning mill has a drive-in graff receiving unit 21 that allows a truck to back directly into the receptacle (as suggested by the tire tracks 107 shown in FIG. 9) and to dump the graff by unhooking the rear gate and raising the truck box (as illustrated in FIG. 1).

Figure 11:
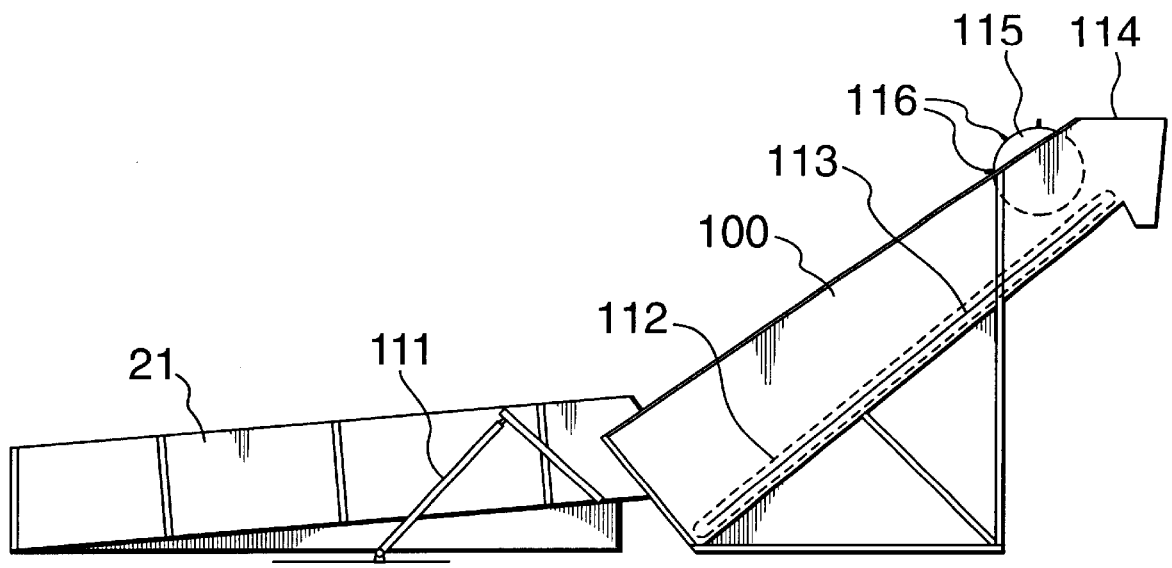
FIG. 11 is a side elevation of a graff receiving unit and graff conveyor, on an enlarged scale, forming part of the cleaning mill of FIG. 9, the receiving unit being in the down position ready to receive a graff transportation vehicle.
Figure 12:
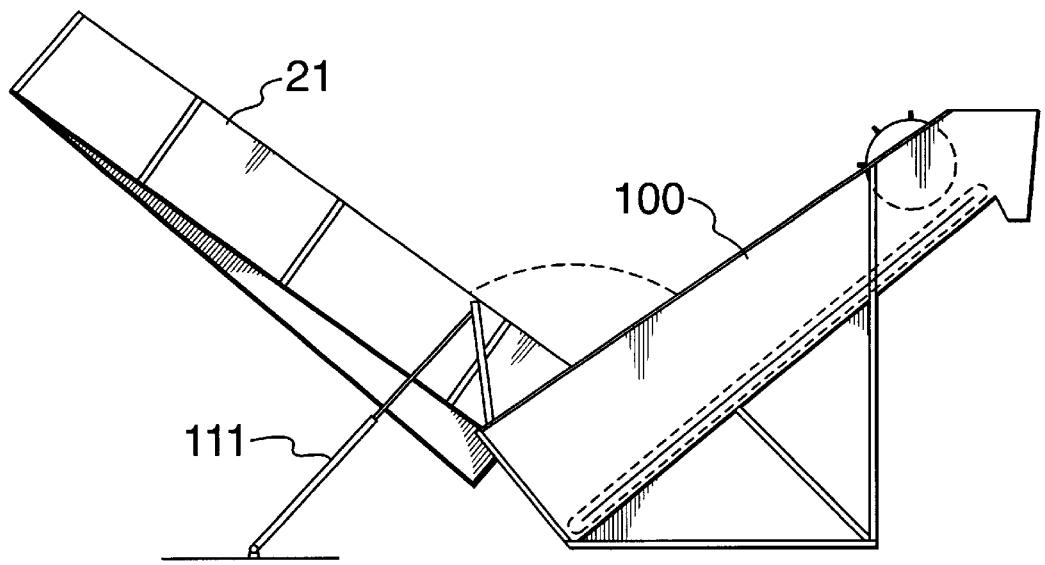
FIG. 12 is a view similar to FIG. 11, but showing the receiving unit in the raised position for feeding graff to the graff conveyor.

The graff receiving unit 21 is a grain receptacle in the form of a flat box 108 having a slightly ramped bottom wall 109 and two longitudinal side walls 110, but no end walls. The unit is aligned with the more steeply upwardly ramped graff feeding apparatus or conveyor 100 forming an inclined surface. FIGS. 11 and 12 are side views showing the receiving unit in a receiving position (FIG. 11) awaiting a graff delivery, and in the upturned operational position (FIG. 12), in which the receiving unit acts as a chute so that graff is urged onto the bottom end of the graff conveyor 100. The tilting of the receiving unit is controlled by hydraulic cylinders on each side of the unit (although only one is shown in FIGS. 11 and 12).

In the case of the graff conveyor, the ramped surface 113 is provided with a rotating drag chain conveyor 112 that moves up the ramp and carries graff to the upper end 114. A rotating delivery roller 115 at the upper end of the drag chain conveyor functions to beat back graff coming up the conveyor and equalize out the graff across the width of the box (usually 10 feet wide) so that only a 4 to 8 cm (1.5 inch to 3 inch) mat of graff proceeds to the top 114 of the graff receiving unit. The thickness of the mat is determined by the adjustable distance from the drag chain 112 to the roller 115. The roller is positioned a short distance (a few centimetres) above the upper end of the ramped surface 113, and is provided with projecting teeth 116 spaced along and around the circumference of the roller. The delivery roller is rotated rapidly by a motor (not shown) and, as noted, feeds a "mat" or carpet of graff (i.e. a continuous strip of even width and thickness) into an upper entrance 117 of the aspirator unit 101 (see FIG. 9). The graff conveyor 100 serves the purpose of lifting the graff from ground level to an elevated position from which it may be subjected to aspiration as it falls vertically back to ground level within the cleaning mill. A second function of the drag chain conveyor 112 is to meter (by changing the speed of the conveyor driven by a variable speed motor) the correct volume of graff delivered to the top 114 of the receiving unit and into the aspirator 101. Therefore, by varying the speed of the conveyor and by varying the distance between it and the roller 115, acceptable amounts of graff can be metered into the aspirator 101. It is important that the entire width of the aspirator (3 m (10 feet) for 91,000 liters (2,500 bushels) per hour) is matched to the width of the receiving unit to facilitate the continuous material flow capability of the entire machine.

Figure 13A:
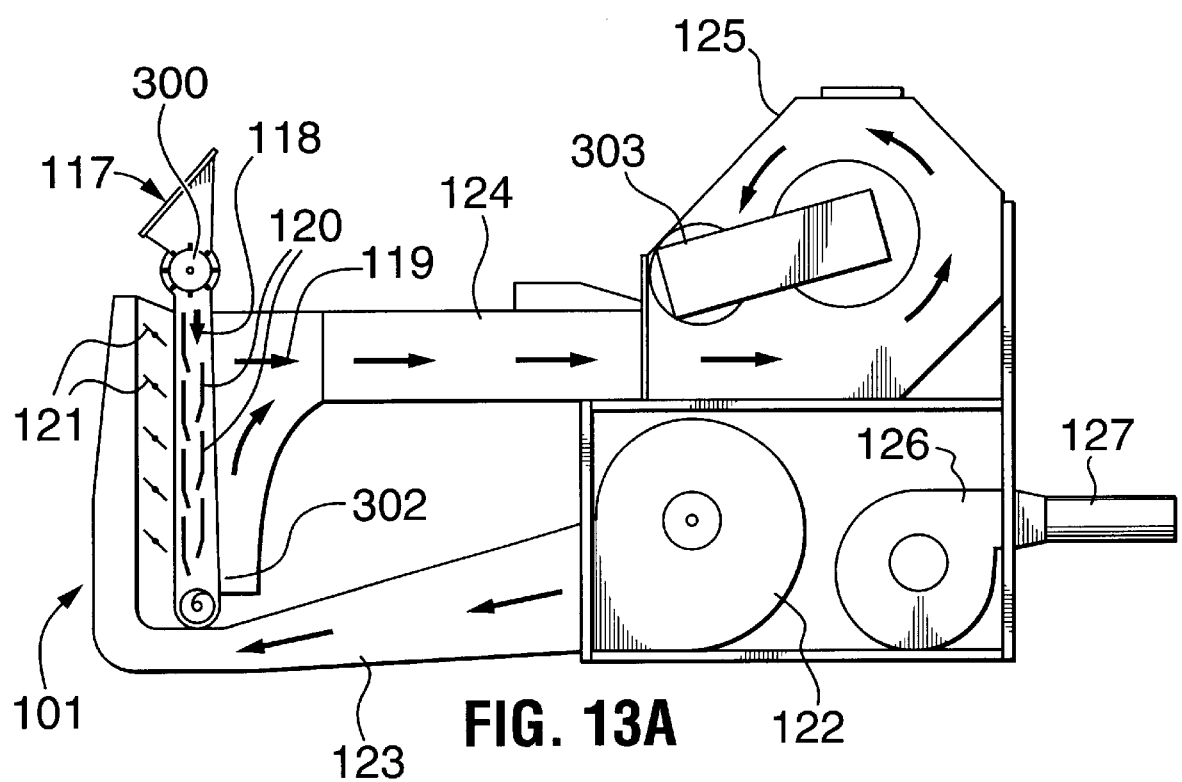
FIG. 13A is a side elevational view of the aspirator, fan and centrifugal separator forming a closed graff cleaning circuit and forming part of the apparatus of FIG. 9.
Figure 13C:
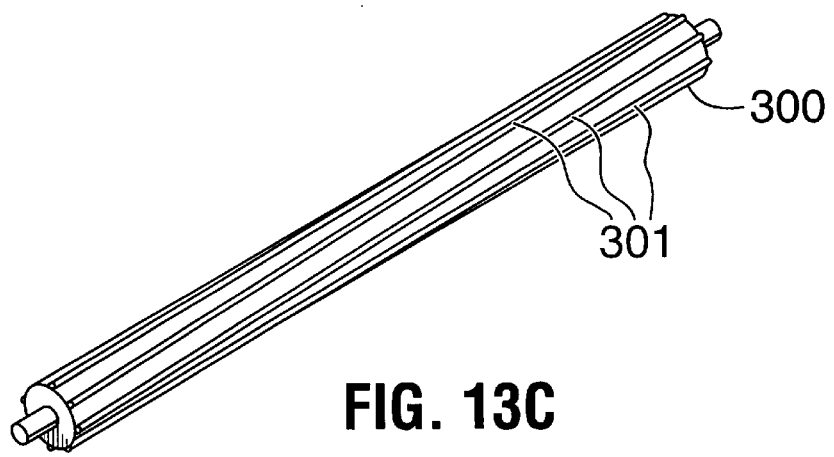
FIG. 13C is a perspective view of a reel used in the apparatus of FIGS. 13A and FIG. 13B.
Figure 13B:
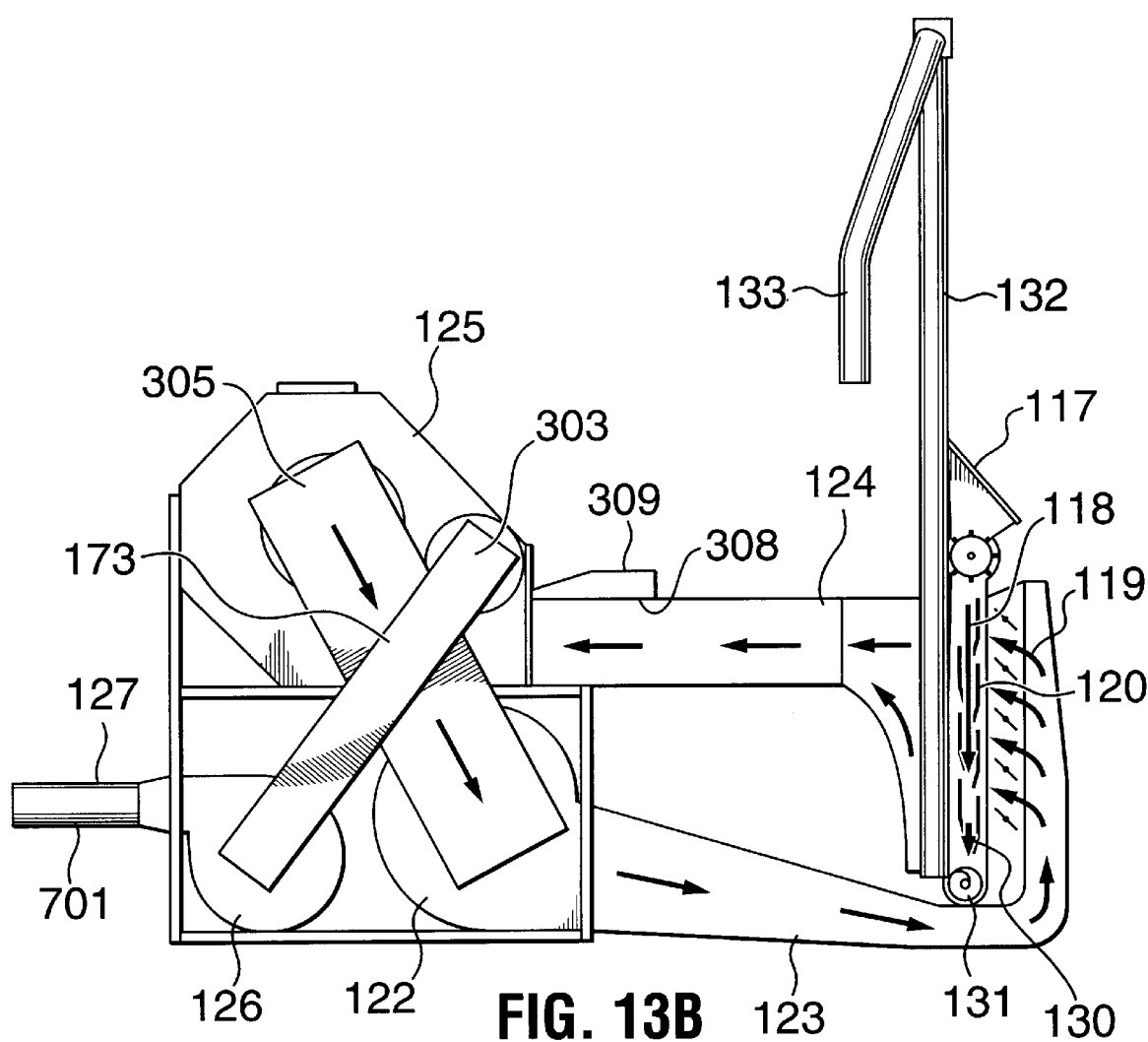
FIG. 13B is a view similar to that of FIG. 13A from the other side.

The aspirator 101 is shown in greater detail and in isolation from the other equipment in FIG. 13A, 13B and 13C. The mat or carpet of graff passes through an entrance 117 to the aspirator unit and directly encounters an aspirator reel 300. The reel is shown in isolation in FIG. 13C and it will be seen that a number of rubber cogs 301 (three inches in height) are arranged along the surface of the reel with a slight twist (preferably about 10°) in the axial direction to facilitate entry of the graff into the aspirator. The rubber cogs 301 form an air seal preventing air under pressure in the aspirator 101 from escaping through the inlet 117. It will be seen from FIG. 13A that there is no free space within the entrance 117 to allow graff to settle and clog the apparatus. Once graff passes through the entrance 117, it is immediately taken up by the reel which delivers it to the aspirator. As a stream 118 of graff falls vertically through the aspirator, it is subjected to a lateral airflow 119 that impinges on one side (the front) of the stream and passes through to the other side carrying away chaff and other light materials. The aspirator has six drop zones defined by baffles 120. The air flow through each drop zone is controlled by a manually adjustable damper 121 at the drop zone's inlet. In each drop zone, the air stream passes through the falling graff.

Figure 13D:
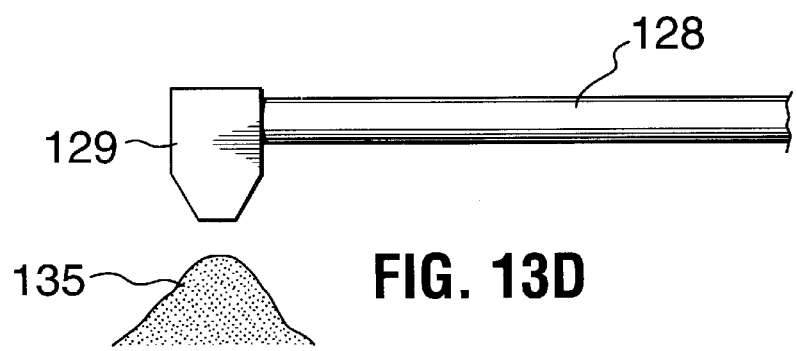
FIG. 13D is a sketch showing a millings discharge pipe having a cyclone deceleration unit at its free end.

The airflow 119 is created by a fan 122 which moves air along a lower duct 123 to a front end of the aspirator, and then, after passing through the falling stream of graff 118, returns the air (and entrained chaff and light materials) through an upper duct 124. If too much air is entering into the front of the aspirator 101, air can be bled off directly into the return air flow by a manually operated gate 302. A centrifugal (cyclone) separator 125 removes the chaff and light materials from the air flow before the air returns to the fan 122. The separated mixture of chaff and light materials (referred to as "millings") is conveyed by a material conveying fan 126 (see FIG. 13B) to a conveying tube 127 and may be delivered to a suitable storage pile, container, or vehicle via a pipe 128 (see FIG. 13D) attached to the conveying tube 127. The pipe 128 (which may be as long as 15 to 21 m (50 to 70 feet)) has a small cyclone unit 129 at its remote end acting as a decelerator for the millings to prevent widespread distribution of this light material, and allowing it to collect into a pile 135.

The operation of the separator cyclone 125 is governed by the fan 122 (see FIG. 13A) operating at a volume of about 340 m³ (12,000 cubic feet) per minute (for 91,000 liters (2,500 bushels) of graff per hour throughput). The fan forces air through the aspirator 101 and along duct 124 to the separator 125. The millings material contained in the airflow upon reaching the separator clings to the outer wall of the separator by centrifugal force and moves to a final discharge portal 303. The discharge through portal 303 is assisted by air equalization tube 304 shown in FIG. 9 and by the discharge fan 126 shown in FIG. 13B. Within the separator 125, clean air in the middle of the unit is returned to the fan 122 by duct 305 shown in FIG. 13B. The cleaned air is driven by the fan 122 and returns to the aspirator 101 via ducting 123 to a front side of the aspirator. The ducting forms a closed loop for the air to recirculate between the centrifugal separator 125 and the aspirator 101. Dust build-up within the closed loop is avoided by the introduction of make-up air from the rolling mill 172 and screening unit 103.

The heavy material 130 (aspirated graff, which contains the grain and weed seeds, etc.) collects at the bottom of the aspirator 101 and is removed by a horizontal cross auger 131, then raised by paddle elevator 132 (see FIG. 9) to a drop tube 133, from which it falls into the screening unit 103 for separation into the desired cleaned grain product and other a secondary product comprising the remaining organic material.

Figure 10:
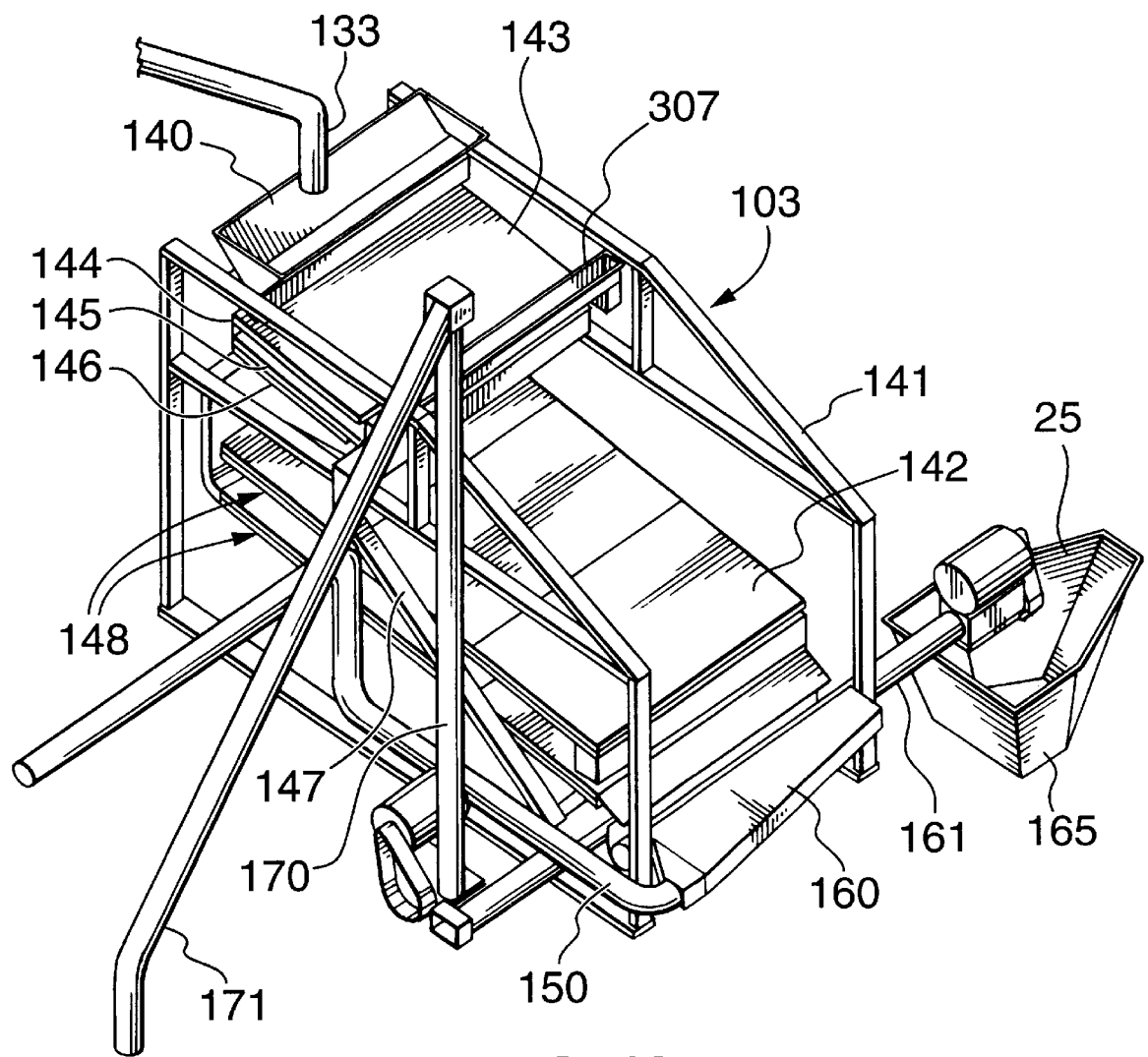
FIG. 10 is a perspective view on an enlarged scale of a screening unit forming part of the cleaning mill of FIG. 9.

The screening unit 103 is shown in detail in the perspective view of FIG. 10. The material delivered from drop tube 133 falls into a split (bidirectional) leveling auger 140 positioned at the upper end of the screening unit which serves to distribute the material evenly across the screens. The unit consists of an open framework 141, retaining a number of downwardly sloping oscillating screens 142 arranged in two groups or "shoes." The opening size of the screens decreases from the uppermost to the lowermost screen, so that larger particles are collected on the upper screens and smaller particles descend to the lower screens. A separation of the aspirated graff based on particle size is thus obtained. The top shoe 143, contains three scalping screens 144, 145 and 146, through which the grain passes and large material is removed. The first screen 144 of this shoe directs stones and larger debris to a hopper 307 from which it exits the machine. The second and third screens, through which grain kernels drop, direct larger crop material to a trough 147. From the top shoe, the grain flow is divided and dropped onto two screens on the bottom shoe 148. The bottom shoe 148 contains two sets of three inclined, oscillating sizing screens. The grain passes over the screens while the "screenings" (weed seeds, small kernels, etc.) pass through and are gathered in a trough below the screen. The grain then drops through a plenum 160 with a cross-flow air stream where dust is removed from the grain and conveyed through a dust delivery tube 150. The grain falls into a cross-conveyor 161, which delivers the grain 25 into a hopper 165. From the hopper, the grain is conveyed to storage.

Screenings from the two top shoe screens and the six bottom shoe screens are gathered in troughs and routed via drop tubes to the bottom shoes screenings collection trough. From this trough, the screenings are delivered into a paddle elevator 170, which lifts the screenings to a drop tube 171, from which the screenings fall into an intake hopper of a rolling mill 172 (see FIG. 9) where the screenings are rolled. From the bottom of the rolling mill 172, air is drawn along with the rolled screenings into a duct 308 connected to an intake 309 of the cyclone separator 102. Within the separator 125, the rolled screenings from the mill 172 are re-combined with the light material from the aspirator 101 and the dust from the plenum 160 of the screening unit 103 delivered via dust delivery tube 150.

As already noted, solids (millings) separated from the air by separator 125 are drawn by a portion of the air through a duct 173 into a material-conveying fan 126 (FIG. 13B). The fan helps to remove the millings and air from the separator 125 in a continuous manner without disrupting the centrifugal separation effect within the separator. This has proven to be in improvement on the usual air lock provided for removal of solids from a separator. The fan 125 also makes it possible to project the millings a considerable distance from the machine via conveying tube 127 and pipe 128 to the small cyclone decelerator 129. The millings, which consist of just about all of the organic matter from the graff other than the grain kernels are dropped into a pile 135 for storage. Weed seeds in this material have been passed through the rolling mill 172 and thus are no longer viable (i.e. they are inert). Moreover, small screened grain kernels are also crushed, making them more digestible for cattle. The collected millings are therefore a valuable product that may be used as animal feed or for other purposes. Despite this rolling step, only a single material (other than the cleaned grain) is discharged from the mill because of the recirculation of rolled material to the intake of the separator unit where it is mixed with light materials from the aspirator. Of note is also the final air bath applied to the cleaned grain just before it is discharged from the mill. This air bath removes fine dust that is also recirculated to the intake of the separator 125.

Of course, if desired, the rolled material and/or the dust from the air bath need not be returned to the separator, but could be discharged independently merely by rerouting the indicated piping. The material from the screens (screenings) is by itself a high protein feed material.

A particular advantage of the cleaning mill is that, if desired, it can be operated automatically, essentially without an operator. Computer control ensures normal operation of the mill at all times.

Figure 14:
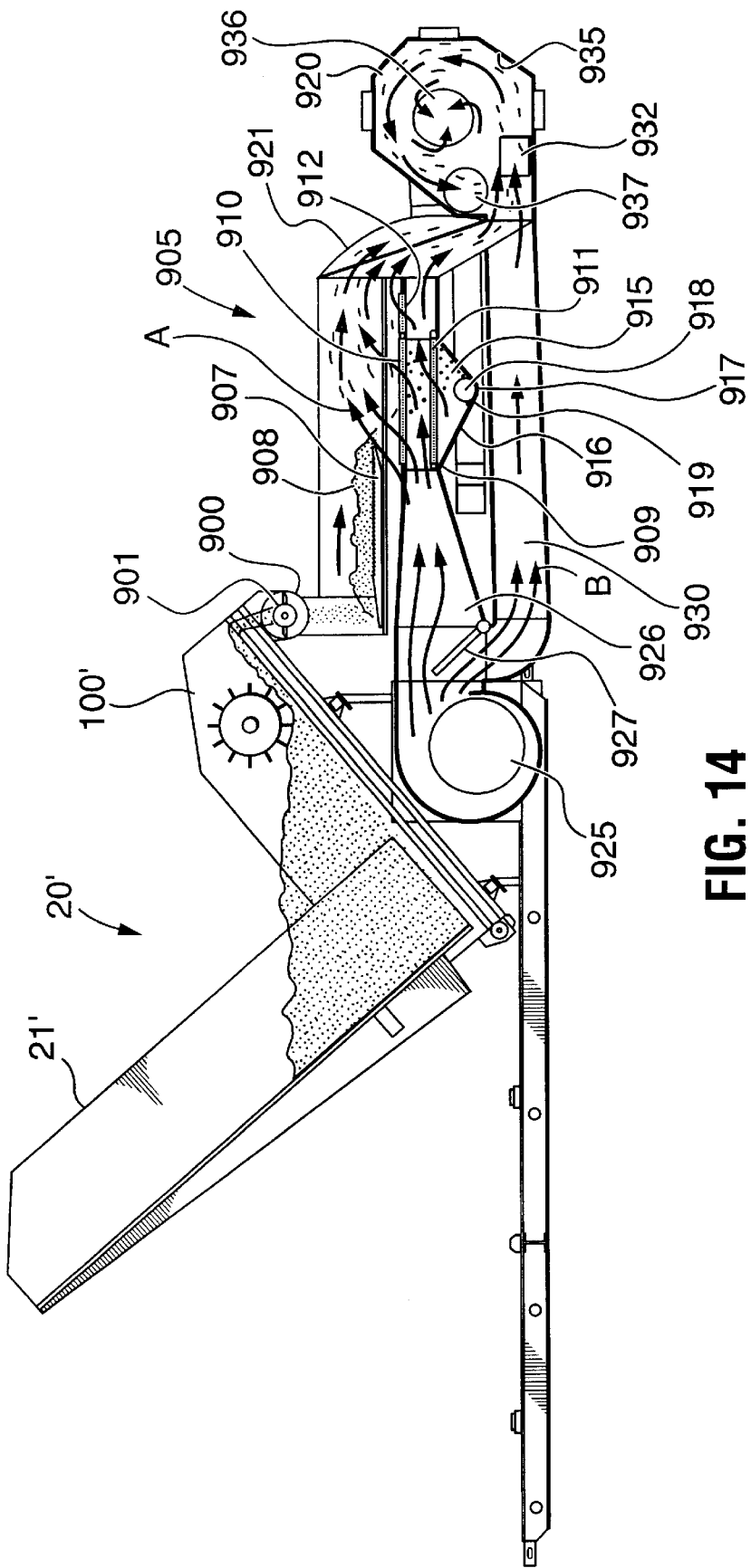
FIG. 14 is a side elevation of a cleaning mill, graff receiving unit and graff conveyor according to a second preferred embodiment of the present invention showing the graff receiving unit in an upright position containing a transported load of graff.
Figure 15:
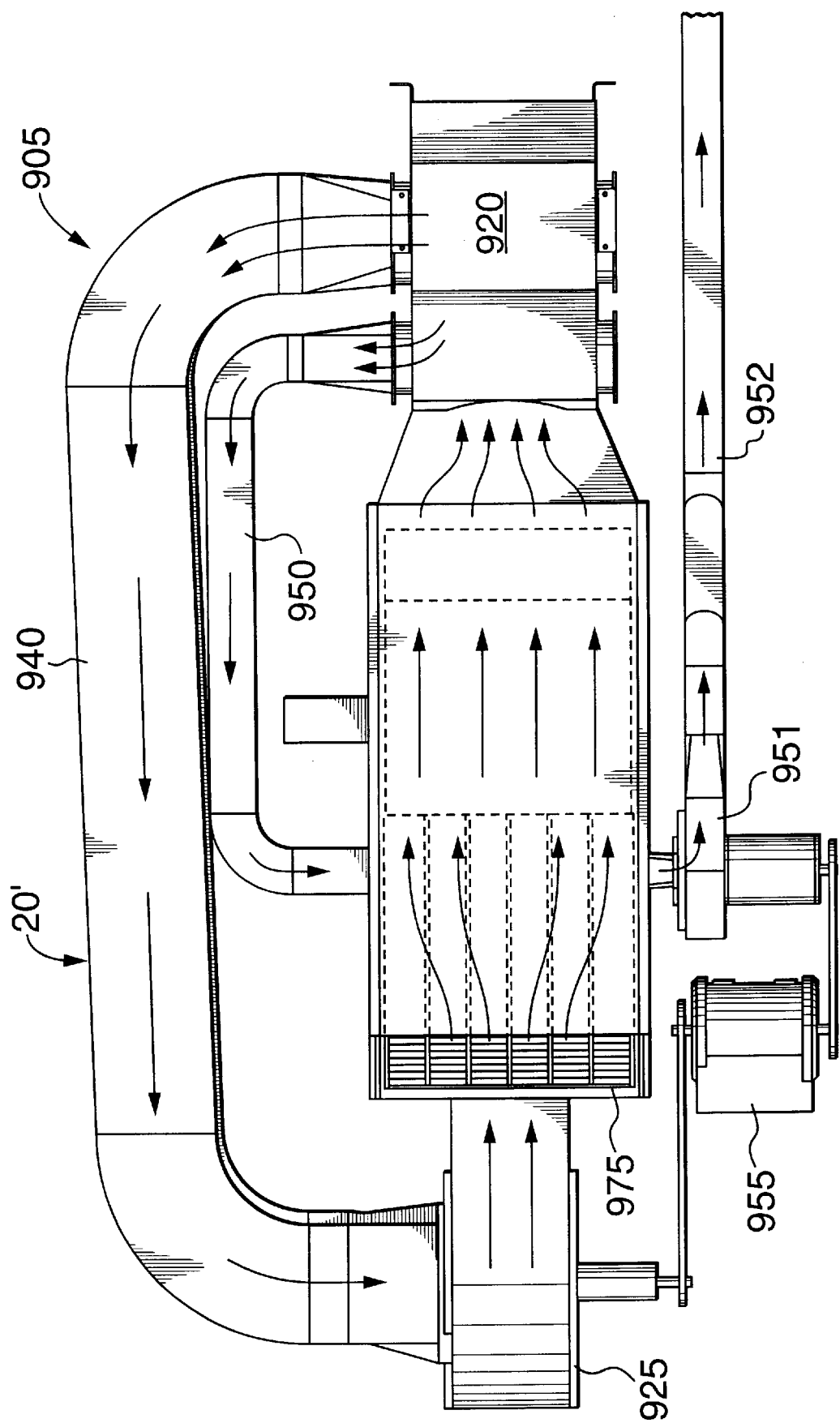
FIG. 15 is a top plan view of the cleaning mill (the graff receiving unit and graff conveyor having been omitted) according to FIG. 14.

An alternative embodiment of the cleaning mill is shown in FIGS. 14 and 15. In this embodiment, the graff receiving unit 21' (which forms an open receptacle for the graff) and the graff conveyor 100' are essentially the same as in the previous embodiment and allow graff to be deposited as a full load from a truck by upending the truck box, dumping the graff load, and delivered in a constant stream to a laterally elongated upper inlet 117' of the cleaning mill without binding or blocking and without the need for intermediate storage. However, upon passing through the inlet 117', the graff enters a transverse channel 900 containing a cross-directed gathering auger 901 (which preferably has a diameter of 43 cm (17 inch)). The purpose of this auger is to reduce the width of the graff flow from that of the graff conveyor 100' (approximately 3 m or 3.3 m (10 or 11 feet)) to that of the width of the cleaning mill itself, which is somewhat narrower (approximately 143 cm (56 inches)). By this means, the both the cleaning mill and the conveyor may be designed to have optimal widths for their intended functions, even though those widths may differ.

In this embodiment, the screening unit 103 of the previous embodiment is incorporated into the main body 905 of the cleaning mill 20'. This makes the cleaning mill more compact and easier to operate. As shown in simplified schematic form in FIG. 14, upon leaving the transverse channel 900 at the central opening 975, the graff falls onto a grain pan 907 provided with a reciprocating action that tends to stratify the graff into components of different density and levels the graff into an even carpet 908 having a width of 0.6 to 1.2 m (2 to 4 feet). The grain pan moves the graff forwards until it falls onto a cleaning shoe 909. The cleaning show includes an upper chaffer screen 910 and a lower grain sieve 911 (both of which are of adjustable mesh size) that are reciprocated back and forth in an opposed motion. A short extension sieve 912 is also provided at the distant end of the chaffer 910. This can be adjusted independently of the chaffer, and can be raised at an angle to slow down the flow of material, if desired. The chaffer and grain sieve each preferably have a surface area of about 1.7 m² (17.9 sq. ft.). The mesh size of the chaffer is larger than that of the grain sieve. As the graff passes through the shoe 909, large chaff, stalks, cut heads and stones are separated mainly by the chaffer 910 and then intermediate contents (e.g. weed seeds, small chaff, stalk parts, etc.), are separated at the grain sieve 911. Essentially only grain 915 itself passes through the grain sieve 911 and falls to a collection pan 916 that has sloping front and rear walls directing the grain to a central trough 917 for removal by a cross auger 918 through a grain exit 919.

As the graff is separated into its components in this way, air is blown upwardly and outwardly through the shoe 909 as indicated by arrows A. This air flow suspends essentially all of the graff components except the grain and heavy objects such as stones. In fact, as the graff drops onto the shoe 909 from the grain pan 907, it encounters a blast of air forceful enough to blow away essentially everything but clean grain kernels of the desired size (and heavy objects, such as stones). This reduces the amount of separation required to be carried out by the shoe 911 itself. Both the suspended chaff and the heavy objects proceed to a cyclone separating unit 920. The suspended chaff is carried by the air flow, whereas the heavy objects are moved by the reciprocating action of the shoe sieves into the inlet 921 of the cyclone unit.

The airflow is created by a fan 925 (e.g. a 16.5 kW (22 hp) centrifugal fan creating a throughput of 400 m³/min (4,000 cubic feet/minute)) positioned within the cleaning mill beneath the graff conveyor 100'. The fan directs air into conduit 926 leading to the cleaning shoe 909, but an adjustable diverter 927 is provided upstream of the shoe to direct a portion of the air into a bypass conduit 930 as indicated by arrows B. The air from the bypass 930 nevertheless also enters the cyclone unit 920 with the air that has passed through the cleaning shoe 909. The diverter allows the airflow A through the shoe to be made appropriate for cleaning the graff (designed to blow away everything below kernel removal) while still allowing a high rate of airflow through the cyclone unit 920. The diverter 927 may be either manually adjustable or automatically controlled based on the rate of feed of graff into the cleaning mill.

A stone cleanout door 932 is provided at the bottom of the cyclone unit 920 to allow stones and other large or heavy objects to be removed periodically from the bottom of the cyclone unit where they tend to collect as they are not removed by the airflow.

The cyclone unit 920, by virtue of the spiral flow of air there through and the density of the suspended chaff, causes the suspended chaff to congregate around the inside wall 935 of the unit so that clean air that is substantially free of chaff and other solids may exit the unit through a central opening 936. The chaff, propelled by a further flow of air, exits a chaff delivery port 937 located at an outside lower region of the cyclone unit. The clean air is recirculated directly to the fan 925 via ducting 940 (see FIG. 15), although a certain amount of clean air from the outside may be introduced into the recirculated air, e.g. through an elongated slot provided adjacent to the graff entrance 117', to replace air escaping with the chaff and to reduce the build-up of dust (about 90% recirculation is usual).

The solids exiting chaff delivery port 919 contains chaff proper, weed seeds, unthreshed heads, and small grain kernels. As shown in FIG. 15, this is conveyed through ducting 950 to a high speed centrifugal material-conveying fan 951 provided with paddle-like blades. The fan has a hammering, impacting or chopping effect that reduces the size of large items and tends to crack, nick or crush weed seeds and small grain kernels (thus making them less liable to germinate). The fan is preferably operated at a speed of about 3293 rpm, giving the fan a velocity at its blade tips of about 440 km/hr and a throughput of about 57 m³/min (2000 cubic feet/minute). Obviously, variations (e.g. ±10%) of these speeds and velocities may be employed, provided the desired material conveying and seed cracking effects are obtained. The material exiting the fan is then conveyed through tubing 952 to a desired location where it is discharged to form an open pile (not shown) (or it may, if desired, be discharged into a silo or other form of container, however the crushed millings adhere to themselves and cake together so the material tends not to blow away from an open pile). The millings form a good quality animal feed similar in nutrient content to hay. The fan 951 and tubing 952 may convey the solids up to a distance of about 60 m (200 feet) from the cleaning mill, depending upon the power of the fan 951. The fan 951 acts to both convey the separated solids and to crush them. It acts at a fast rate of throughput and is rarely subject to blockage, plugging or failure for other reasons. This is all achieved at a reasonable cost in power to operate the fan.

In a preferred form of this embodiment, as shown, a single motor 955 is used to drive both the air fan 925 and the material-conveying fan 951. This is preferably a written pole (single phase) electric motor of 30 to 37.5 kW (40–50 hp). Approximately eight additional small electric motors (of approximately 1.5–2.25 kW (2–3 hp) each) are required for the complete operation of the cleaning mill. Advantageously, all these motors may be designed to operate on single phase power that is most readily available on farms and in remote areas.

The cleaned grain exits the grain delivery port (propelled by the positive air pressure in the cleaning mill or extracted by an auger) and is delivered by an auger to a storage container (e.g. one or more silos—not shown).

The cleaning mill of this embodiment maintains a constant recirculation of air and a constant stream of graff into the mill and constant streams of cleaned grain and the remaining constituents from the mill. The illustrated unit is capable of processing 91,000 liters (2500 bushels) of graff per hour. The receiving unit 21' is capable of holding at least 27,000 liters (750 bushels) of graff. A single load from a truck can therefore be processed in about 20 minutes.

The mill can be essentially left to operate without supervision. The truck operator can use a remote control device to lower the receiving unit as the truck approaches, dump the load of graff, and then set the cleaning mill in operation and leave for another load. The mill may be computer controlled to raise the receiving unit in stages to feed the graff conveyor appropriately, and to run all of the fans and motors until a sensor indicates that all of the graff has been processed. The unit may then shut itself off automatically, awaiting the next load.

What we claim is:

1. A mobile graff harvesting unit including a wheeled harvester body and a harvesting header at the front of the harvester body, the harvester body containing a threshing unit adapted for separating stalks in a cut crop from graff, a mixture including grain, chaff and weed seeds, a discharge, and a storage tank, whereby a crop cut by said harvesting header from a field area is threshed by said threshing unit to separate said stalks from said graff, said graff is collected within said storage tank and said stalks are returned to said field area via said discharge, said harvesting unit including an elongated hitching arm having opposite lateral ends, said hitching arm being connected at one of said ends to the harvester body and having means at said other of said ends adapted for attachment to a rear portion of a propulsion device provided with a power take off shaft, the hitching arm having a raised section intermediate said opposite ends passing over and clear of said harvesting header; wherein said hitching arm carries and guides a driveline for transferring power from said power take off shaft of said propulsion device to the harvesting unit, said driveline comprising at least one rotatable shaft adapted for connection to said power take off shaft.

2. The harvester unit of claim 1, wherein said harvesting header has a raisable cutter bar, and said raised intermediate section of said hitching arm extends over and clear of said cutter bar when said cutter bar is in both lowered and raised positions.

3. The harvester unit of claim 1, wherein said end of said hitching arm attached to said harvester body is pivotable about a substantially vertical axis.

4. The harvester unit of claim 3, wherein steering means acting on said hitching arm are provided on said harvester body to adjust or maintain the angle of the hitching arm relative to the harvester body at said vertical axis.

5. The harvester unit of claim 1, wherein said driveline comprises a plurality of rotary shafts joined by constant velocity or U-joints allowing said driveline to follow the contour of the hitching arm from one of said opposite ends to the other.

6. The harvester unit of claim 1, wherein said hitching arm houses hydraulic or pneumatic tubes for conveying hydraulic or pneumatic fluid under pressure from the propulsion device to the harvesting unit.

* * * * *